(12) United States Patent
Priest

(10) Patent No.: US 10,572,118 B2
(45) Date of Patent: Feb. 25, 2020

(54) PATTERN-BASED DESIGN SYSTEM

(71) Applicant: David Michael Priest, Ottawa (CA)

(72) Inventor: David Michael Priest, Ottawa (CA)

(*) Notice: Subject to any disclaimer, the term of this patent is extended or adjusted under 35 U.S.C. 154(b) by 1113 days.

(21) Appl. No.: 14/132,127

(22) Filed: Dec. 18, 2013

(65) Prior Publication Data

US 2014/0298230 A1     Oct. 2, 2014

Related U.S. Application Data

(63) Continuation-in-part of application No. 14/059,011, filed on Oct. 21, 2013, now abandoned.

(60) Provisional application No. 61/846,759, filed on Jul. 16, 2013, provisional application No. 61/806,020, filed on Mar. 28, 2013.

(51) Int. Cl.
    *G06F 17/50*       (2006.01)
    *G06F 3/0484*      (2013.01)

(52) U.S. Cl.
    CPC .......... *G06F 3/04842* (2013.01); *G06F 17/50* (2013.01); *G06F 17/5004* (2013.01)

(58) Field of Classification Search
None
See application file for complete search history.

(56) References Cited

U.S. PATENT DOCUMENTS

| | | | | |
|---|---|---|---|---|
| 5,825,660 A | * | 10/1998 | Cagan | G06F 17/509 |
| | | | | 703/2 |
| 5,986,670 A | * | 11/1999 | Dries | G06F 17/5004 |
| | | | | 345/629 |
| 6,114,978 A | * | 9/2000 | Hoag | G06F 3/0482 |
| | | | | 341/22 |
| 7,933,605 B2 | * | 4/2011 | Rappaport | H04W 16/20 |
| | | | | 455/423 |
| 8,301,389 B2 | | 10/2012 | Dunlap | |
| 9,959,675 B2 | * | 5/2018 | Gal | G06F 17/50 |

(Continued)

FOREIGN PATENT DOCUMENTS

WO    WO 2007/138560     12/2007

OTHER PUBLICATIONS

Extended European Search Report, Application No. EP 14 16 1802.5, dated Dec. 10, 2014, (13 pages).

(Continued)

*Primary Examiner* — Kibrom K Gebresilassie
(74) *Attorney, Agent, or Firm* — Rosenberg, Klein & Lee

(57) ABSTRACT

A system is provided for obtaining a landscape design pattern based on selected landscape design elements in a landscape design system having landscape design patterns comprised of at least two of said landscape design elements. The system stores multiple landscape design elements in a storage device, enables a user to select a plurality of landscape design patterns each of which includes a plurality of landscape design elements, matches the landscape design elements in the selected landscape design patterns with stored landscape design patterns, and renders the selected landscape design patterns using stored landscape design elements. The system preferably stores photographs of the multiple landscape design elements, and retrieves and displays photographs of the matched landscape design elements. In one implementation, a unique mnemonic code is assigned to each of the stored landscape design elements.

18 Claims, 18 Drawing Sheets

(56) References Cited

U.S. PATENT DOCUMENTS

| | | | |
|---|---|---|---|
| 2004/0044986 A1* | 3/2004 | Kompalli | G06F 8/20 717/100 |
| 2004/0100473 A1* | 5/2004 | Grzeszczuk | G06T 15/50 345/581 |
| 2004/0205695 A1 | 10/2004 | Fletcher | |
| 2005/0058971 A1* | 3/2005 | Bugosh | G09B 25/06 434/151 |
| 2005/0168973 A1* | 8/2005 | Chuang | A41G 1/005 362/122 |
| 2007/0011982 A1* | 1/2007 | Swift | G01C 11/00 52/604 |
| 2007/0013724 A1* | 1/2007 | Swift | G06F 17/5004 345/660 |
| 2007/0050234 A1* | 3/2007 | Corlett | G06F 17/50 705/7.29 |
| 2008/0015947 A1* | 1/2008 | Swift | G06Q 30/00 705/26.1 |
| 2008/0125892 A1 | 5/2008 | Hoguet | |
| 2009/0037884 A1* | 2/2009 | Benameur | G06F 11/3608 717/126 |
| 2010/0031230 A1* | 2/2010 | Gschwind | G06Q 10/06 717/105 |
| 2010/0177204 A1* | 7/2010 | Tsuchiya | H04N 5/232 348/222.1 |
| 2011/0219352 A1* | 9/2011 | Majumder | G06F 17/50 716/139 |
| 2011/0316845 A1* | 12/2011 | Roberts | G06T 19/006 345/419 |
| 2012/0084167 A1 | 4/2012 | Corlett | |
| 2012/0229508 A1* | 9/2012 | Wigdor | G06F 3/147 345/633 |
| 2012/0264510 A1* | 10/2012 | Wigdor | G06F 3/011 463/31 |
| 2012/0307075 A1* | 12/2012 | Margalit | G06T 1/0007 348/180 |
| 2013/0264389 A1* | 10/2013 | Shaffer | G07D 7/00 235/462.2 |
| 2014/0067530 A1* | 3/2014 | Pluche | G06Q 30/0267 705/14.53 |
| 2014/0123094 A1* | 5/2014 | Colwell | G06F 17/5077 716/126 |
| 2014/0298229 A1* | 10/2014 | Priest | G06Q 10/04 715/771 |
| 2015/0286456 A1* | 10/2015 | Griffin | G06F 3/1446 345/1.2 |
| 2015/0356774 A1* | 12/2015 | Gal | G06F 17/50 345/633 |

OTHER PUBLICATIONS

"Landscape design has reached a new era—Computer Design Software", Irrigation & Green Industry Network, Landscape, available at http://www.igin.com/article-3286-computer_design_software.html, Feb. 15, 2013, (6 pages).

"Pro Landscape software easy to use", Product Overview available at www.youtube.com/watch?v=BmbVdVQGO_Q, (1 page).

Zhang et al., "Study of the CAD in Landscape Gardening Design", Applied Mechanics and Materials; Information Technology Applications in Industry, vol. 264-255, No. Pt. 3, Jan. 1, 2012, (pp. 1944-1946).

* cited by examiner

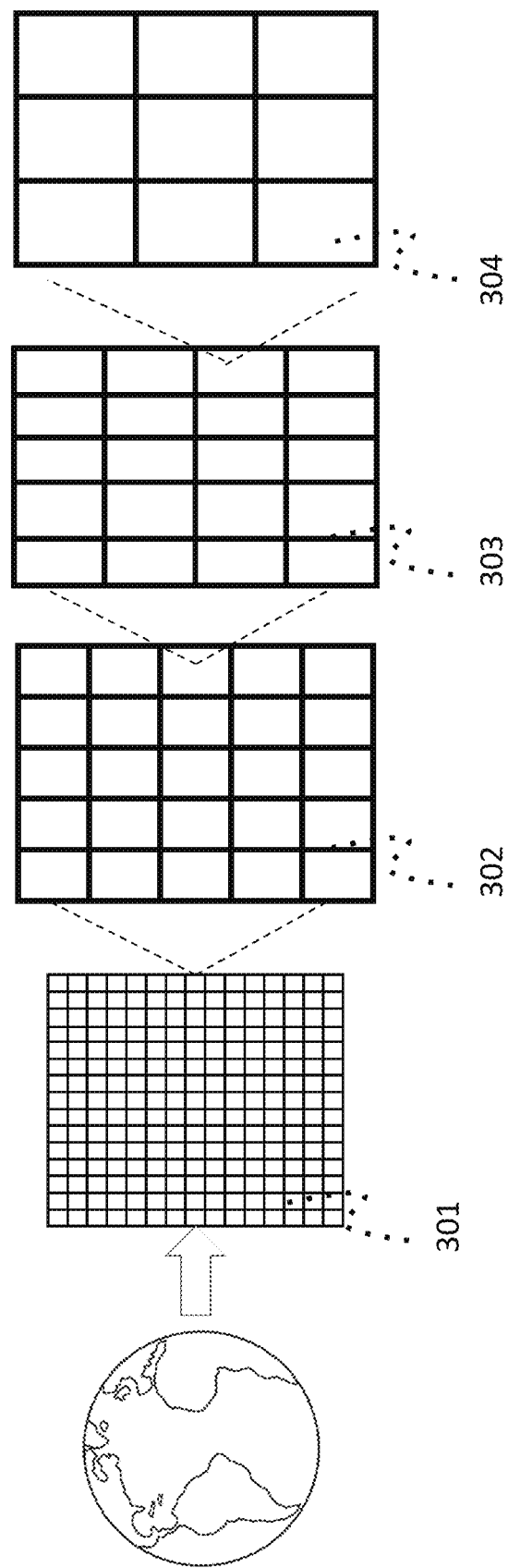

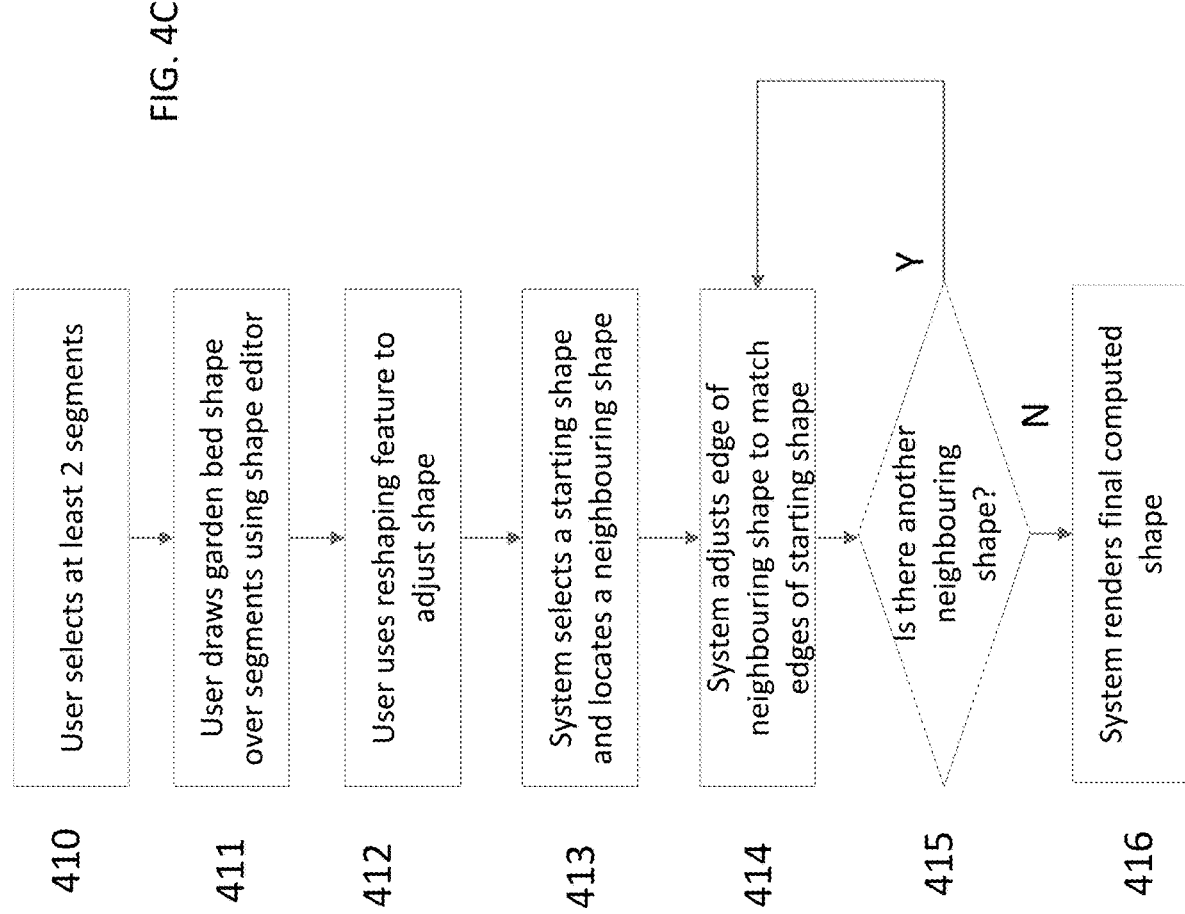

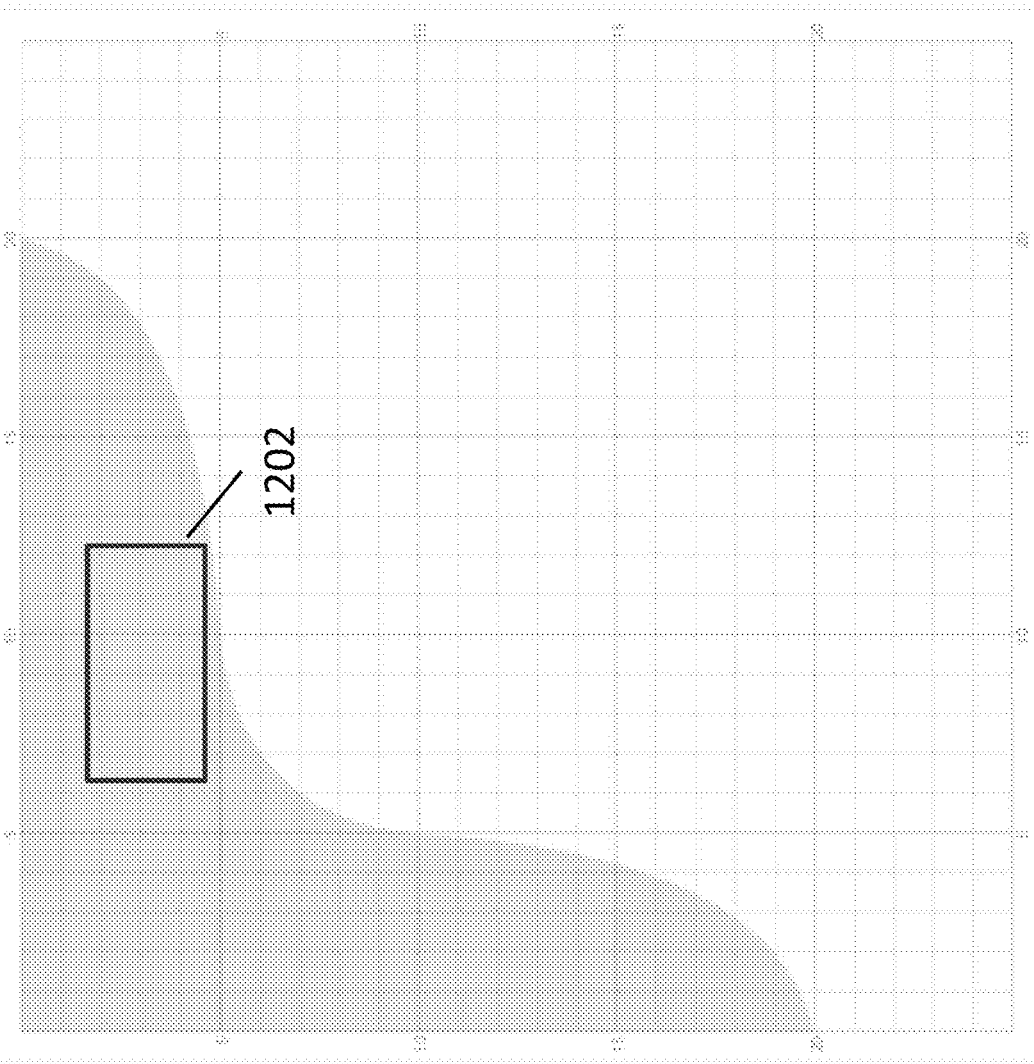

PATTERN-BASED DESIGN SYSTEM

CROSS-REFERENCE TO RELATED APPLICATION

This application is a continuation-in-part of and claims priority to U.S. application Ser. No. 14/059,011, (now abandoned) filed Oct. 21, 2013, which claims the benefit of U.S. Provisional Patent Application No. 61/846,759, filed Jul. 16, 2013 and U.S. Provisional Patent Application No. 61/806,020, filed Mar. 28, 2013, each of which is hereby incorporated by reference herein in its entirety.

FIELD OF THE INVENTION

The present disclosure relates to design systems, for example garden or landscape design or interior design systems and specifically to a design system which uses a coding system to allow a user to find and purchase merchandise from a participating merchant, based on the design.

SUMMARY

In accordance with one embodiment, a system is provided for obtaining a landscape design pattern based on selected landscape design elements in a landscape design system having landscape design patterns comprised of at least two of said landscape design elements. The system stores multiple landscape design elements in a storage device, enables a user to select a plurality of landscape design patterns each of which includes a plurality of landscape design elements, matches the landscape design elements in the selected landscape design patterns with stored landscape design elements, and renders the selected landscape design patterns using stored landscape design elements. The system preferably stores photographs of the multiple landscape design elements, and retrieves and displays photographs of the matched landscape design elements. In one implementation, a unique mnemonic code is assigned to each of the stored landscape design elements.

The system preferably enables a user to select locations for the selected landscape design patterns and/or the selected landscape design elements relative to each other in a landscape design. In one implementation, the selected locations of the selected landscape design patterns and/or the selected landscape design elements are evaluated by comparing the selected locations with a predetermined set of rules regarding the placement of the selected landscape design patterns and/or the selected landscape design elements relative to each other.

In another embodiment, a system is provided for obtaining a landscape design pattern based on selected landscape design elements in a landscape design system having at least one design station, a plurality of landscape design patterns and a plurality of landscape design elements. The system enables a user to select at least one of the plurality of landscape design patterns, each pattern including at least two of said landscape design elements; select at least one landscape design station; request a layout instruction for the selected landscape design station and a selected landscape design pattern; and locate the landscape design elements for the selected landscape design pattern within said merchant premises. Then the landscape design pattern can be physically constructed at the selected landscape design station based on the layout instructions.

BRIEF DESCRIPTION OF THE DRAWINGS

The foregoing and other advantages of the disclosure will become apparent upon reading the following detailed description and upon reference to the drawings.

FIG. 3 provides an example of how the earth is divided to provide the geographical segments.

FIG. 4C shows a flow chart of the steps involved in rendering the final design shape.

FIG. 12B is a diagrammatic illustration of a displayed view port for use in selecting a portion of a pattern or scene being designed.

Figure 1:
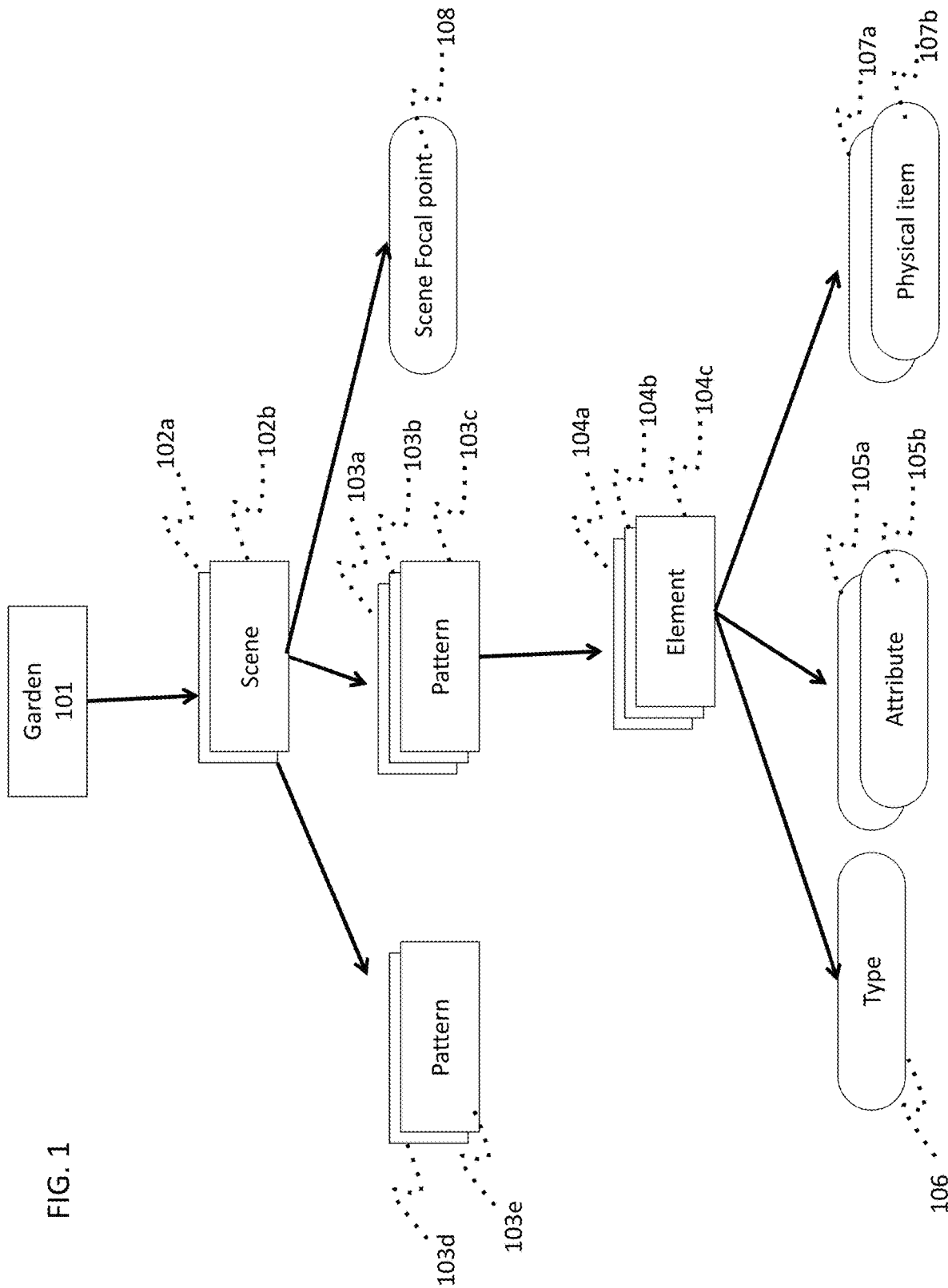
FIG. 1 depicts an example of the relationship between the different components of the system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The implementation of the pattern-based design system is described in the context of a garden or landscape design system, but the system can be implemented for any other designs that could make the use of patterns such as interior designs.

Referring to FIG. 1. The design system described herein uses patterns 103 as a basis for creating a scene 102. A scene 102b comprises one or more patterns 103a-103c possibly including a scene focal point 108 and is meant to be viewed as a whole. A garden 101 consists of one or more scenes 102a, 102b.

A pattern 103c consists of two or more elements 104a-104c. An element is an abstraction of one or more physical items. In the case of landscape design, a physical item can be, for example, a plant, a piece of art or furniture.

An element is defined using a number of attributes 105a, 105b and a type 106. The type indicates whether the element is a plant, art or furniture for example. The attributes in the case of a plant can include, for example, shape, seasonal variability, height, spread, color attributes, texture, and opacity. The color attributes include for example, the bloom color, the patterns and the timing of the bloom, the foliage color, the pattern and the timing of the foliage. Other attributes include, for example, the soil condition, the zone, the amount of light etc.

More than one physical item 107a, 107b can map to the same element as long as they are of the same type, if they share one or more of the same attributes. For example, a pink iris and a pink day lily have similar height, spread, color, texture and opacity, and they both have the same growth conditions. They could be mapped under the same element. Depending on the list of attributes considered more or less physical items match the same elements. For example, if only the height and shape is considered, a shrub and an ornamental grass could map to the same element. But if the soil condition or spread is also considered, then the shrub might not be included as part of the same element.

A pattern 103 comprises two or more elements 104 organized in a spatial manner. Different patterns can use one or more of the same elements. The same elements can appear in different patterns. Two patterns may contain exactly the same elements, but organized differently. Depending on which attributes 105 are considered, two patterns can appear identical or similar. For example, two patterns with elements of the same shape and positioned the same would be identical, but if the texture attribute is considered, the patterns would be different. A pattern, therefore, is defined by the combination of the attributes of all the elements it contains, such as a list of the heights, a list of colors, a list of positions, a list of shapes etc. The system can then use techniques such as a graph database (which includes spatial organization) to find patterns that are identical or similar based on a set of attributes to consider. The system can also determine the summary characteristics of a pattern, such as its color, texture, width etc. based upon analysis of the lists.

Patterns can be defined hierarchically. They can include sub-patterns which in turn can consist of a plurality of sub-patterns. Patterns can also be stitched together to form larger patterns. Some patterns can be made to flow or weave between other patterns.

Figure 2:
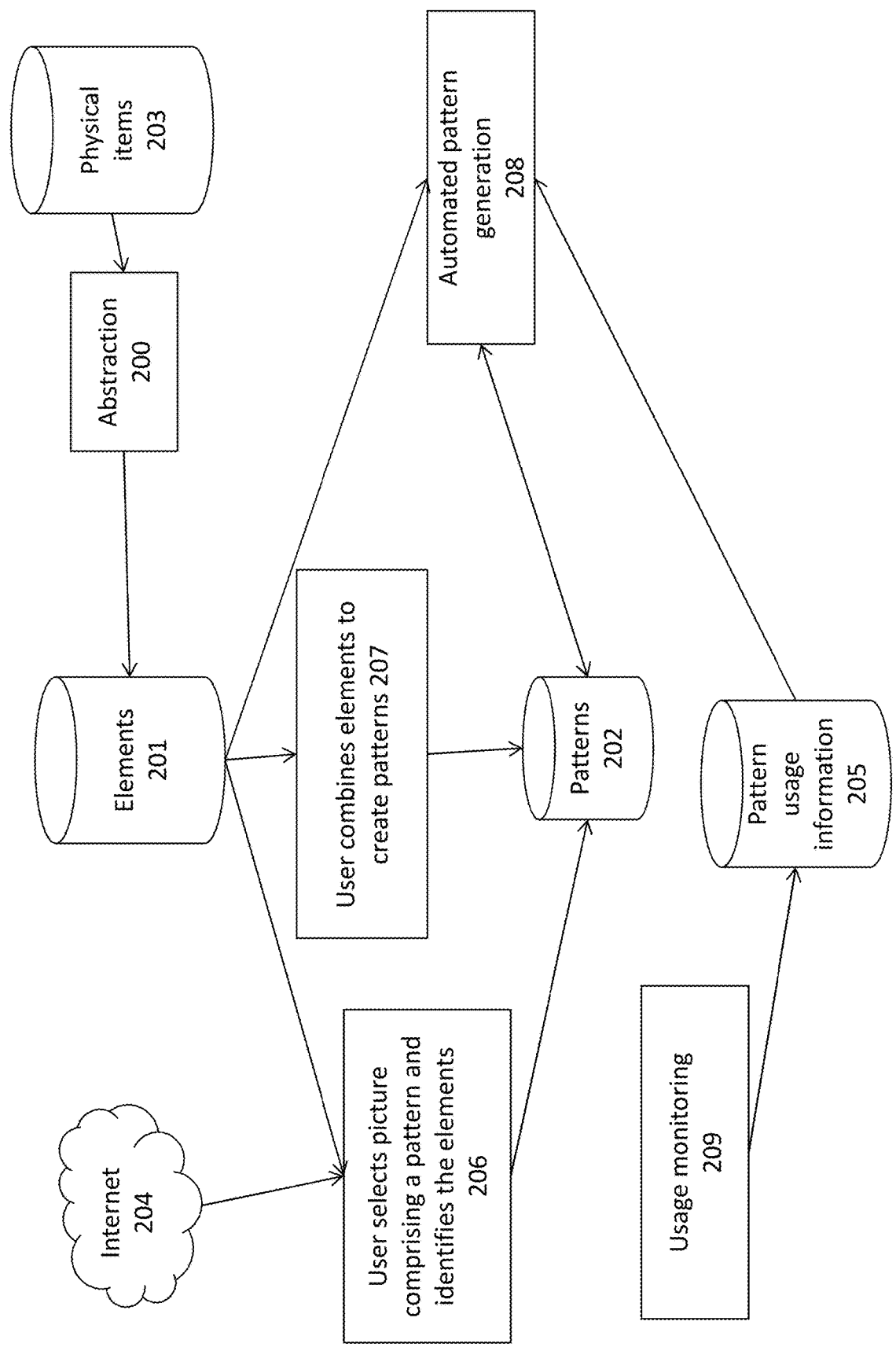
FIG. 2 is a flow diagram of how patterns can be created.

Referring to FIG. 2, patterns are entered into the system through a number of means, such as:
1. a user interface 207 to combine different elements from the element database 201,
2. extracted from pictures from the user 206, the internet 204, or already stored in the system's database (user identifies each element in the picture 206), or
3. generated by the system 208 by combining existing patterns guided by parameters such as size, preferences or conditions (combination rules are "learned" by the system 209 through the analysis of pattern usage information 205).

A pattern focal point can be optionally identified on a pattern. The pattern focal point represents a high contrast (height, size, color, pattern, negative space, different material like a piece of art) that catches the eye and encourages the eye to explore the pattern.

The created or selected patterns are analyzed by the system to create relationships between the elements, which are stored in the pattern database 202. One technique that can be used to analyze the pattern is well known neural network technology. The system maintains a "map" of elements in each pattern and a "map" of sub-patterns within patterns.

The system keeps track of which elements, patterns and scenes the user likes and doesn't like using artificial intelligence methods or similar approach 209. New, similar, or different patterns can be recommended based upon this knowledge.

Patterns can be packaged and marketed/sold to customers who do not wish to perform the design functions. These patterns can be packaged as a scene. A customer may purchase these "building block" patterns or scenes, rather than the traditional approach of designing with individual plants.

Existing plant conditions data is often inadequate when selecting proper plant material for a pattern because the data covers a physical area that is too broad (e.g., USDA zone) or is outdated by changing climate. The system optionally employs a hierarchical geographical location system to track and record data relevant to actual conditions. Referring to FIG. 3, the user first identifies the location of the landscape to be designed using the following hierarchy. First a region is identified. A region 301 is created by dividing the earth into approximately 11,025 $km^2$ rectangles. A region is then divided into approximately 225 $km^2$ districts 302, and each district 302 is divided into 1 $km^2$ locales 303. Each locale 303 is then divided into a collection of 1.5 $m^2$ segments 304. Any other sizes or dimensions or number of divisions are also possible.

Figure 4A:
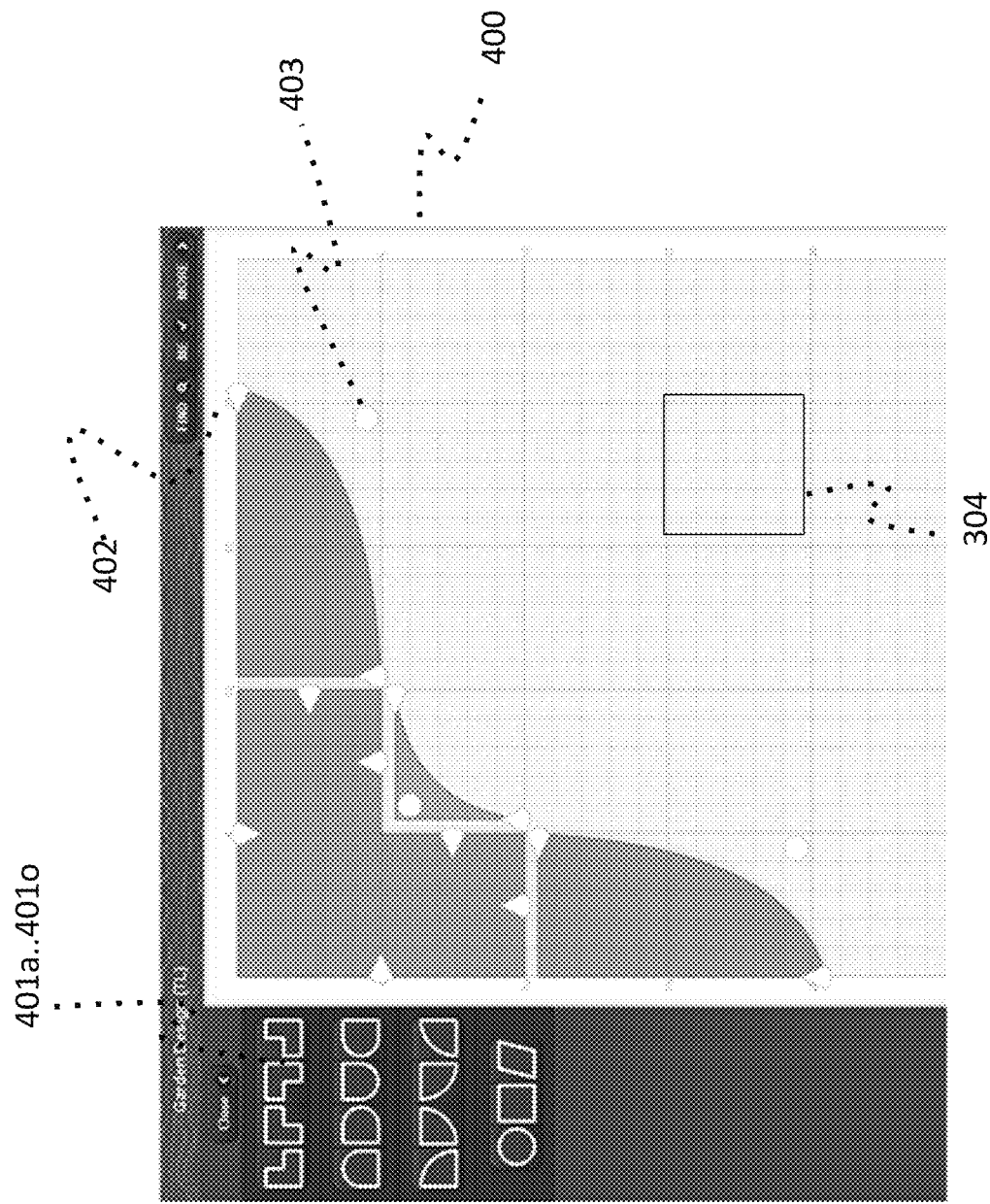
FIG. 4A shows an example of a display of a canvas and design shapes.
Figure 4B:
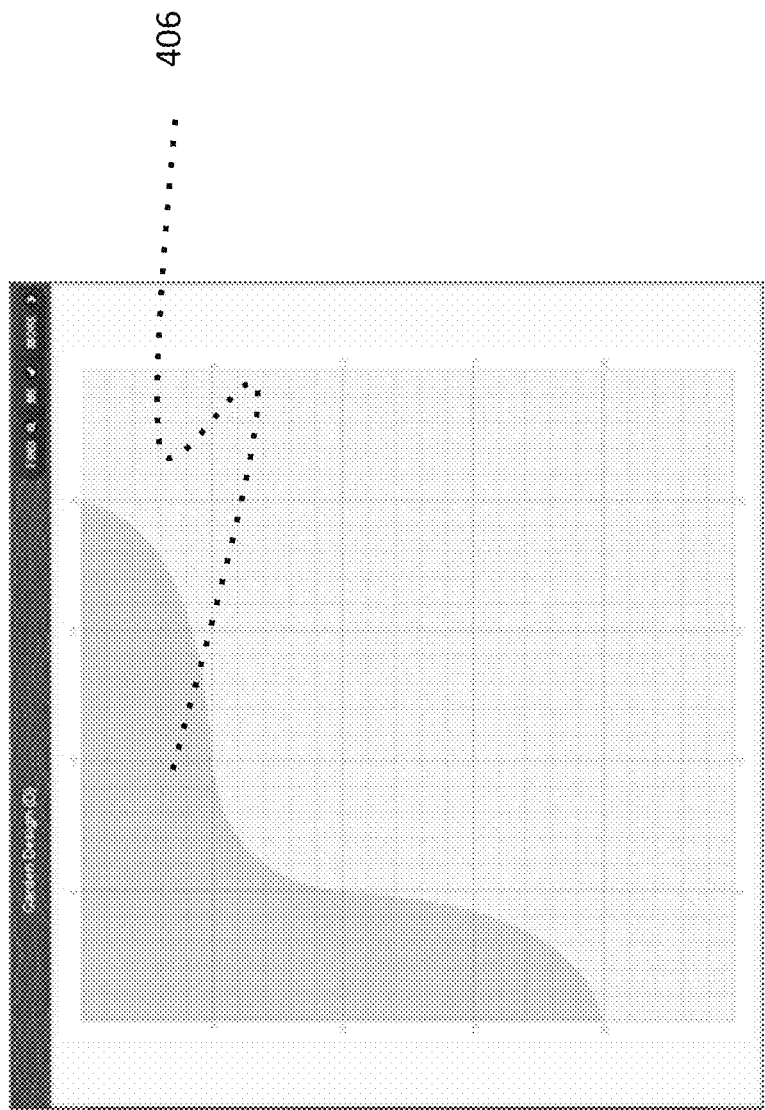
FIG. 4B shows an example of a display of a canvas and a design shape.

The user is provided a canvas of a number of segments 304. The user draws the garden bed shape over the segments using a shape editor, as depicted in FIG. 4A. To simplify the design of the garden bed, several simple shapes 401a . . . 401o are provided and can be collocated on the canvas 400. Arrow handles 402 on the shapes allow reshaping in the direction of the arrows. Point handles 403 allow reshaping in any directions to affect the shape of a curve. When the shape of the segment is complete, the system computes the final shape 406 (FIG. 4B) by combining the different shapes provided. With reference to FIG. 4C, this computation is done using the relative distance of each shape to all others. This approach is considerably simpler than using typical design splines. Using the shape editor feature, the user selects at least 2 segments 410 to represent the user's garden bed and selects the closest representation of the bed from the selection of shapes provided. The user then draws the garden bed shape over the segments 411 and uses the reshaping features described above to adjust the shape overlaying the segment 412. One implementation to create the shape from the simple shapes is to start with one of the simple shapes (e.g., pick one along an edge or the largest one for example), and find adjacent neighbors 413 within an acceptable tolerance. Then, move the neighbor's edges in or out recursively and adjust vertices to match the edges of the starting shape 414 and do the same with the next neighboring shape until all shapes have been adjusted to match up to the starting shape edges 415. The system can then render all the shapes to create a representation of the garden bed shape 416.

Figure 5:
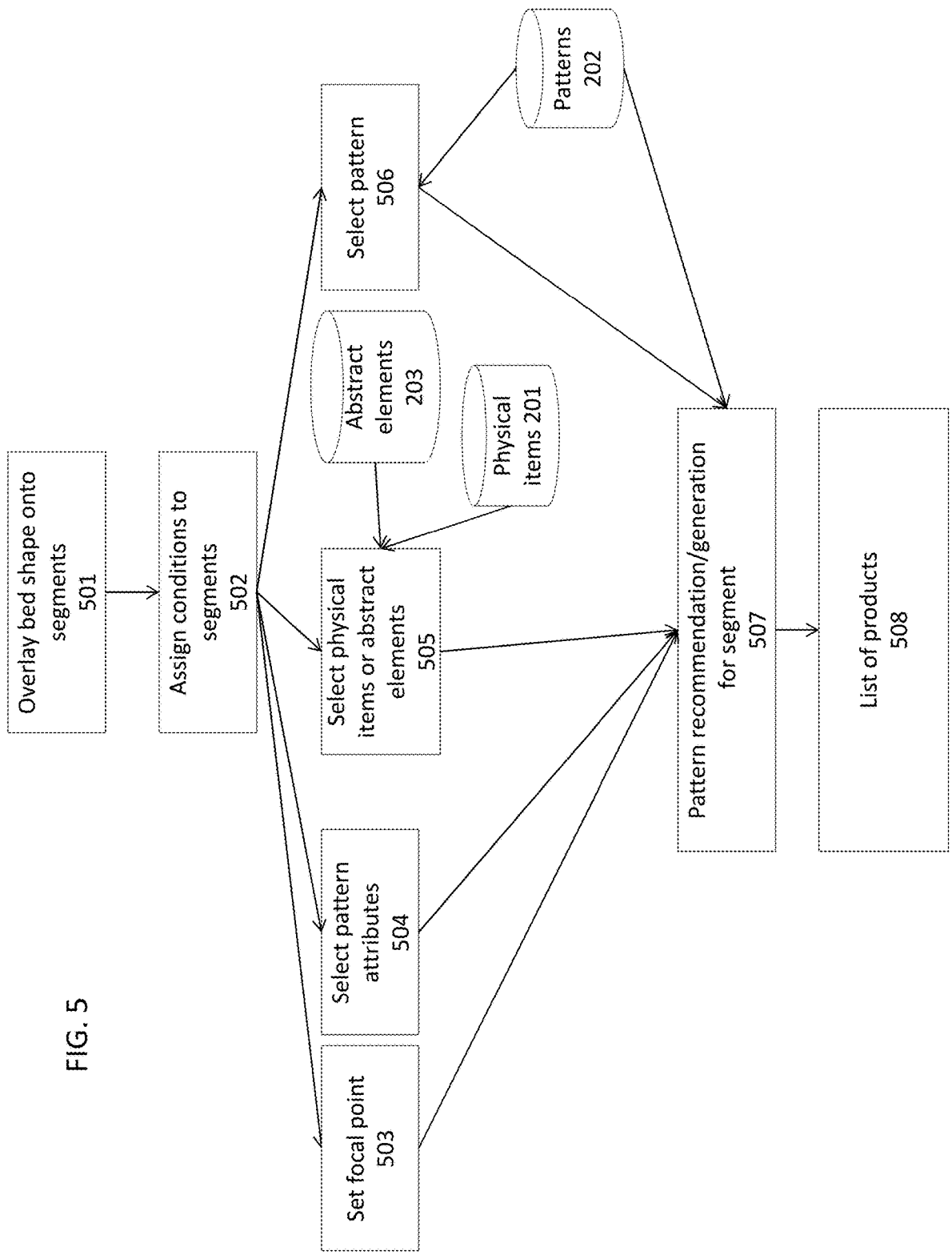
FIG. 5 shows a flow chart of the steps involved in recommending patterns.

Referring to FIG. 5, once the bed shape is overlaid onto the segments 501, the user also identifies one or more conditions 502 for each segment 304 of the canvas. Conditions for the segment include, for example:
- sun: always|morning|afternoon|none
- water: rainfall|as needed|irrigated
- soil: clay|loam|sand
- soil acidity: acidic|neutral|alkaline
- cover: none|tree|over hang
- beside: nothing|building|hedge|fence
- care: little|some|more The user then selects the desired pattern attributes 504 for the segment, for example color, shapes etc. The user can also add 505 existing physical items 201 or abstract elements 203 from the system database onto the segment (using for example a drag and drop capability). Existing patterns from the database can also be added to the segment 506. A scene focal point 108 can optionally be identified on one segment 503 of the scene. Typically only one focal point is used per scene, but any number could be used. The system analyzes the user input taking into account the products available in the nearby districts and the locale's specific climate information to provide a set of recommended patterns 507 for the scene and optionally a list of products to purchase to create the scene 508. If the scene focal point is identified, the system matches a pattern focal point to the scene focal point.

Figure 6:
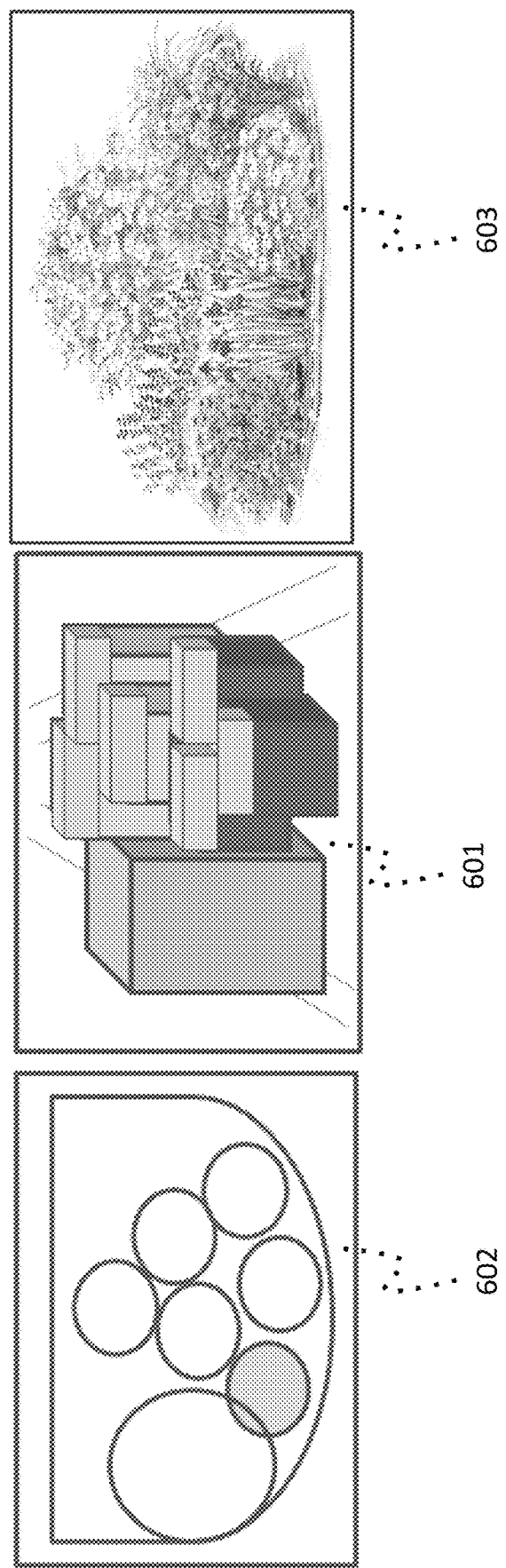
FIG. 6 shows examples of renderings of landscape scenes.

The user can edit the recommended scene, adding, substituting or removing elements or physical items, changing the attributes (e.g., color) and the system can update the recommended scene. The scene is then rendered in different ways to help the user analyze the design. For example, as per FIG. 6, a block view 601 shows holes in the design and color disposition. The plan view 602 shows repetitive patterns. The elevation view 603 (e.g., a water color rendering) can show the design at different growth stages. Other views such as texture view or opacity view can also be provided.

Figure 7A:
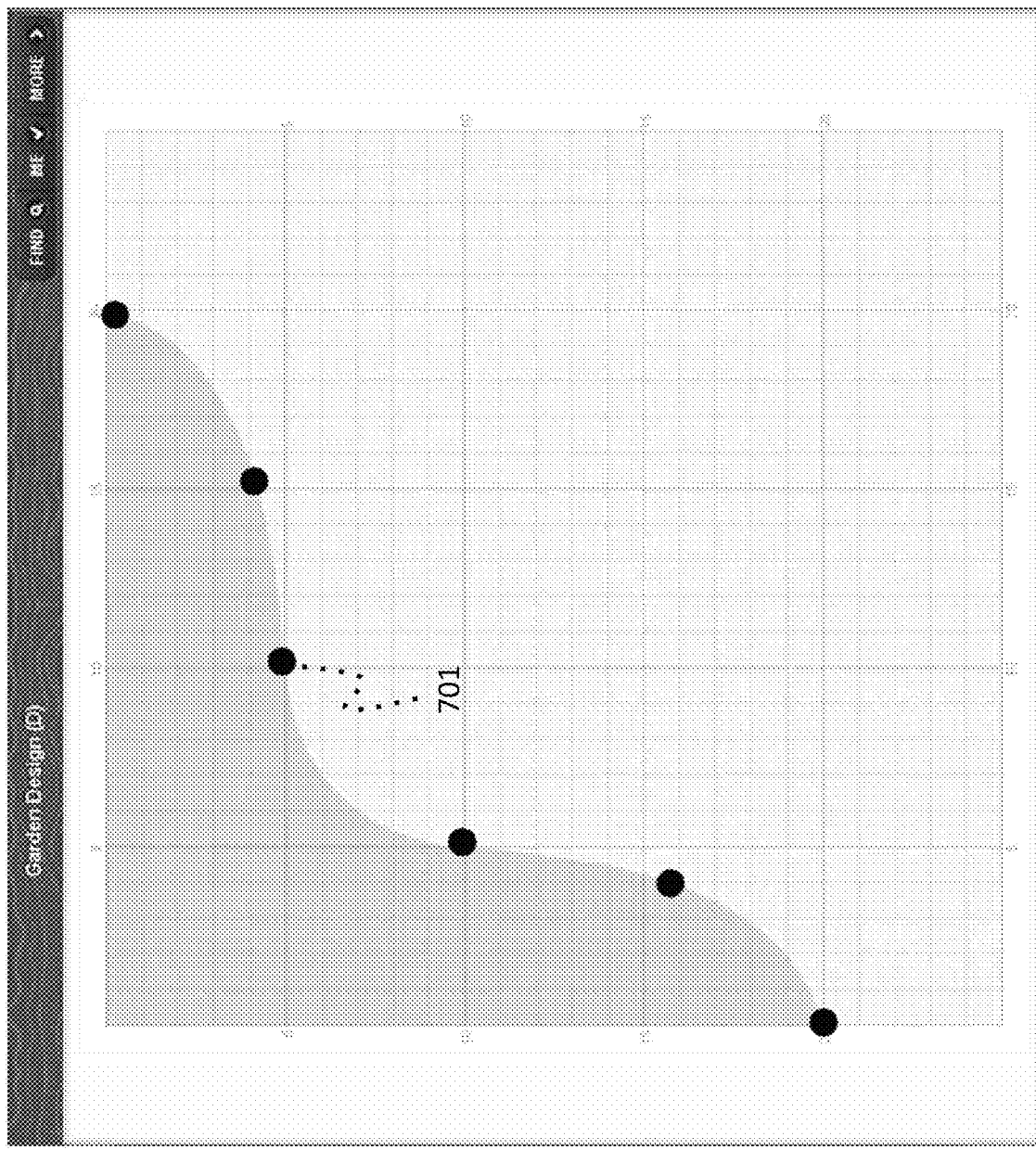
FIG. 7A shows examples of virtual markers on a canvas.

The system also allows creating a virtual scene view. As per FIG. 7A, virtual markers 701 are drawn by the system on the canvas. Physical markers, with locations corresponding to the virtual markers are installed on the perimeter of the actual garden bed following the pattern of the bed shape designed on the canvas, every 5 feet for example. The spacing of the marker could be any value. The markers can be, for example, plastic or metal pegs, integrated into fake rocks, garden border or within a watering or lighting system. The markers use a color pattern that can be recognized by the system even with a busy background. They could be installed using clips on a garden hose or other flexible item that can be formed into the shape of the perimeter of the bed.

The user uses a camera and takes a picture with one or more markers within the viewfinder of the camera: any number of markers can be used to align the scene. After the pictures of all the markers are taken, the pictures are loaded into the system and attached to the virtual marker 701 of the garden bed perimeter design. The pictures are then stitched together using known stitching techniques.

3D imaging systems well known in the art can be used to orient the virtual garden the same way as the physical garden. The virtual camera can now track the physical camera.

The system can therefore map a virtual garden view with real garden pictures. The association of the physical markers to the virtual markers in the system aligns the design to reality. The system maps the pictures to the digital canvas containing the patterns. This assists the user in visualizing how the patterns may appear in the physical space. The system performs analysis on the pictures containing the markers to perform photo enhancement and alignment to the canvas. The system provides a display of the virtual space (canvas) on the physical space (digital images). The implementation maps the physical markers to the virtual markers by combining user selection with pattern recognition.

As another implementation, an additional marker, possibly elevated, is placed to indicate height. When the picture is loaded into the system, the height marker is identified as such and the system uses the marker to provide a three dimensional aspect.

Pictures of the garden at different times of year or over many years can be kept to provide insights on how to evolve the garden.

Since the markers are of a known color, size, etc., they can be automatically removed from the final picture or blended with the background.

In another implementation, an application is loaded on a camera-capable smart-phone/tablet. The application detects the physical markers in the image. The application can perform color correction of the image based on the known colors of the physical markers. The application can map the physical markers in the image to the virtual markers 701 as the pictures are taken. The application can adjust the virtual plan for rotation (left/right), tilt (top/bottom), and zoom (in/out) to align with the physical image. The application can also take into account the movement of the user (camera tilt etc.) to adjust the 3D camera and display the virtual scene accordingly.

In addition to taking and uploading photos, the application can provide additional functions such as real-time over-display of the patterns, conditions and other information on the physical space as seen on the device.

The scene view allows taking the same pictures at different time of year to see how the garden evolves with time and helps with planning at the beginning of the season.

Another embodiment of the system comprises sharing patterns or sub-patterns using social media tools (such as Facebook™ or Pinterest™). The garden design system can also include a social media module to allow the users of the design tool to interact with each other outside of known social media tools. Users can exchange garden patterns and the system will adapt a garden pattern from a different locale to their own locale by recommending plants that can live in their locale but will result in the same or similar pattern.

The system can also interact with local merchants who provide the plants and other physical elements. The local merchant tags each physical element (e.g., plant, piece of art, furniture) of its inventory and enters this data into the system database. Users can enter or scan a special code on the tag and the system can answer queries such as:
- Can this item be used in my scene?
- Which patterns can I build with this item?
- Show me items that complement this one?

In this embodiment, the system's database is synchronized with the inventory of the local merchants. Users can bring their garden design, or list of elements to the merchant premises so that they can identify the elements within their garden design. This may be done by bringing a printout of the design or elements within the design or by using the application on a device (e.g., smart-phone or tablet). A mnemonic barcode may be used to identify design elements within a design or pattern, but other types of codes, known to a person skilled in the art, may also be used as long as the codes are easily understood by both the user and the merchant. For example, possible encoding may include a single letter code for foliage type, another letter for texture, another for bloom, etc. Staff can organize the inventory based on these codes and both staff and users can easily find exact matches.

Figure 7B:
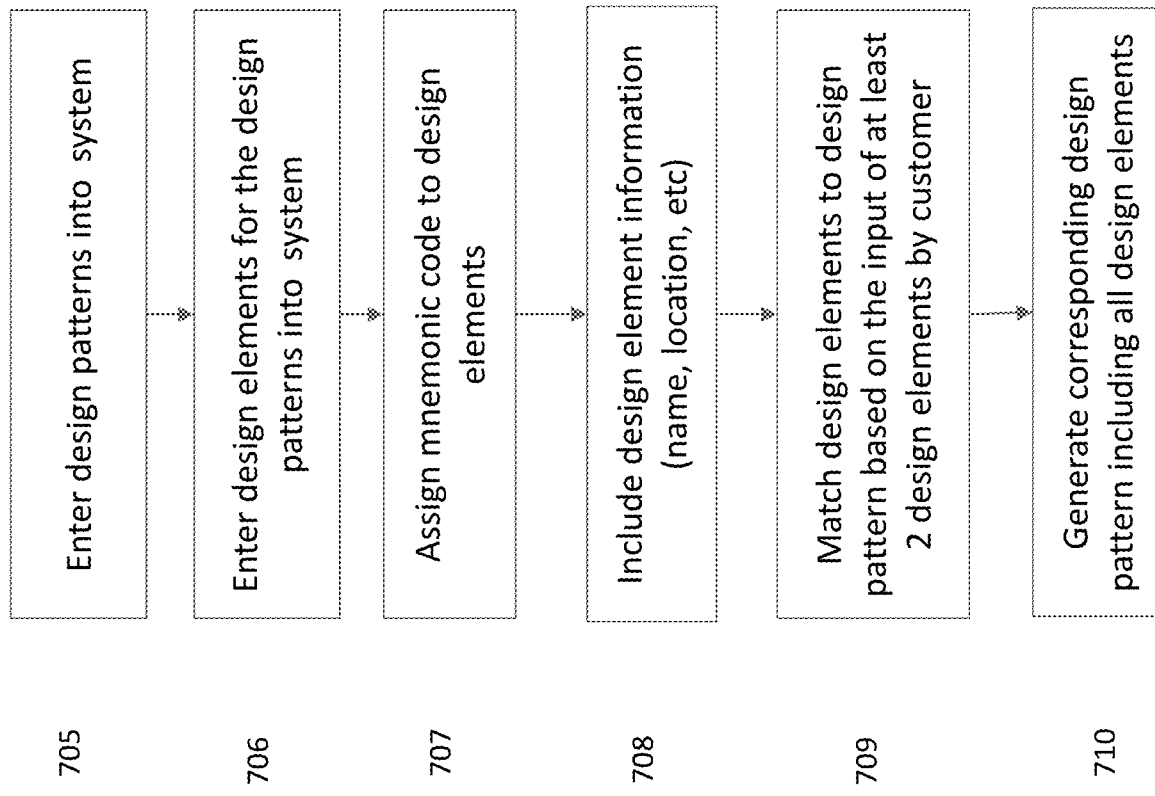
FIG. 7B shows a flow chart of the steps involved in matching design elements to design patterns entered into the system.

The flowchart of FIG. 7B describes the steps required to retrieve a design pattern from the system. Multiple design patterns may be entered into the system and stored in the database at step 705. These designs may be based on designs created by the merchant, the customer or another source. The design elements included in each design pattern are entered into the system at step 706. Each design element has a tag or sticker containing a unique identifier (mnemonic barcode or number) assigned at step 707. The design element is matched to the pattern based on the barcode or number. Information relating to the name of the design element and the location of the merchandise at the merchant's premises is added to the system. A customer scans at least 2 design element codes or numbers and the system matches the scanned elements to the stored pattern at step 709. The pattern, along with the design element information associated with the pattern is rendered and sent to the customer at step 710.

Figure 8:
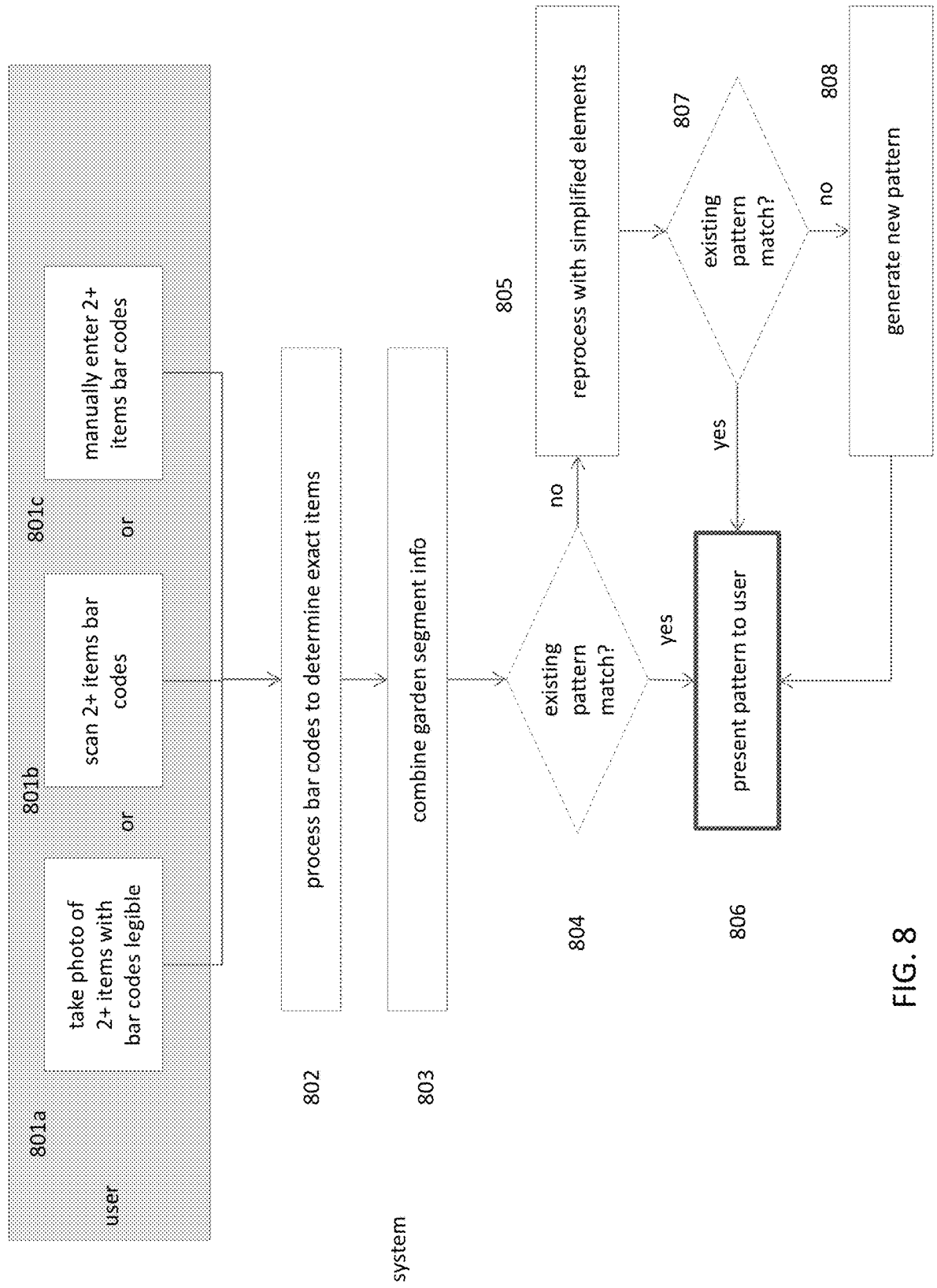
FIG. 8 shows a flowchart depiction of the steps involved for a user to obtain a garden pattern by scanning, photographing or manually entering at least 2 item codes to be used in a garden pattern.

The flowchart of FIG. 8 illustrates a merchant inventory identifier system. The mnemonic barcode may represent foliage type, texture, bloom, shape, size, colour, and other details and may represent a unique design element such as a specific plant, piece of furniture or piece of artwork, or it may represent a group of design elements. For example, the code may group specific types of plants together that have a similar appearance but may respond differently to various attributes, including soil conditions or available sunlight.

The identifier system may include a grouping of design elements (a "pamphlet") that are complimentary, perhaps based on colour, foliage type, climate conditions in that location, etc., that a merchant thinks would appeal to a user. These pamphlet designs, along with other garden designs that the merchant or other users of the system may add, are stored in the system database. The identifier system further includes the entire inventory of relevant items available from the merchant, so that a user may substitute or add different items from those provided in the pamphlet in order to customize a garden design for the user's own personal tastes and needs or to perform substitutions in the event of an inventory shortage.

The merchant may set up the inventory to facilitate the identification of the tag and barcode. Shelves or tables may be stocked with plants that meet certain design requirements and are grouped together based on these requirements. The merchant may further group inventory together in one location within premises that match up to the "pamphlets" by grouping plants, shrubs, furniture and other elements based on the garden design shown in the pamphlet. Elements can be further grouped by their mnemonic code which makes selecting matching items easier for both staff and user.

Optionally, a new "pamphlet" design can be prepared in this way each day such that the merchant can prepare the shelves or tables based on a daily design pick. Since the mnemonic code is easy to understand, the merchant and staff can easily identify the elements to be arranged based on the design pick and group them together based on the mnemonic code. This provides a rough visual representation to the user visiting the merchant premises of what the design will look like, and the user is free to select the same elements or substitute or add different elements that the merchant has in stock, to the pamphlet design displayed.

With reference now to the flowchart of FIG. 8, a user has numerous options available for entering the elements that match the user's design choice into the identifier system using a variety of system access devices, such as a smart phone or other handheld device, a tablet or a PC. The user may take photographs of items available at step 801*a*, including the daily design picks that are displayed on the premises. The photograph must include the tag containing the code and the code, must be legible for each item. This may be done using the camera on a smart phone or tablet or other handheld device. Another option is for the user to scan the items at step 801*b*, again with the code legible in the scan, using a smart phone or other handheld device having the application, or the user may prepare a list and either manually enter the barcodes themselves or have the merchant manually enter the barcodes at step 801*c* for the items into the system. Since a pattern consists of 2 or more elements, at least 2 items must be selected. The scanning option has the added advantage of collecting customer visit data for marketing and future merchandizing purposes, for the merchant.

Once the codes are entered into the system by any of the means used in step 801*a*, 801*b* or 801*c*, they are decoded at step 802 and matched to the garden segment information within the database at step 803. This information is then sent to a query within the system at step 804, to determine if this combination of elements matches existing patterns stored in the database. If a match is found, the stored pattern is supplied to the user at step 806. Otherwise, the system will reprocess the entered elements to find similar elements at step 805 and will again send this information to a query at step 807 to find an existing match with the reprocessed elements. If a match exists, the pattern is provided to the user at step 806, but if no match is found, a new pattern is generated at step 808 and is provided to the user at step 806, such that the user either receives a garden pattern that already exists in the database, perhaps one of the design picks presented by the merchant, or a new pattern that is generated specifically for the user. This step may include a printout of the design, a visual representation of the design on a screen or both. The "pamphlet" garden design picks that are stored in the system database, may be accessed when the user selects at least 2 elements that match up to any pattern within the pamphlet design. It is possible that the input elements may match multiple patterns and therefore multiple designs. In this case the user may select one or more designs. The user can then purchase the items from the local merchant that correspond to the garden design or designs selected by the user. Since the code provided is in a human readable form, substituting elements or adding elements in this step is straightforward for both the user and the merchant.

In another embodiment of the present invention a design station can be provided that will enhance the customer design experience when combined with a feature of the design system called the design assist application. This application has a number of useful capabilities, including providing a demonstration of a design station functionality, providing a layout of a scene or garden design with the physical design elements, making substitutions, exploring various design options, and locating design elements such as flowers, shrubs or other types of plants, within a merchants premises. The design assist application also has some advanced features that allow a customer to interact with the design system software to create designs based on the customer's personal tastes and preferences. It is also capable of downloading photographs of the design to share on social media sites such as Facebook or Pinterest.

Figure 9:
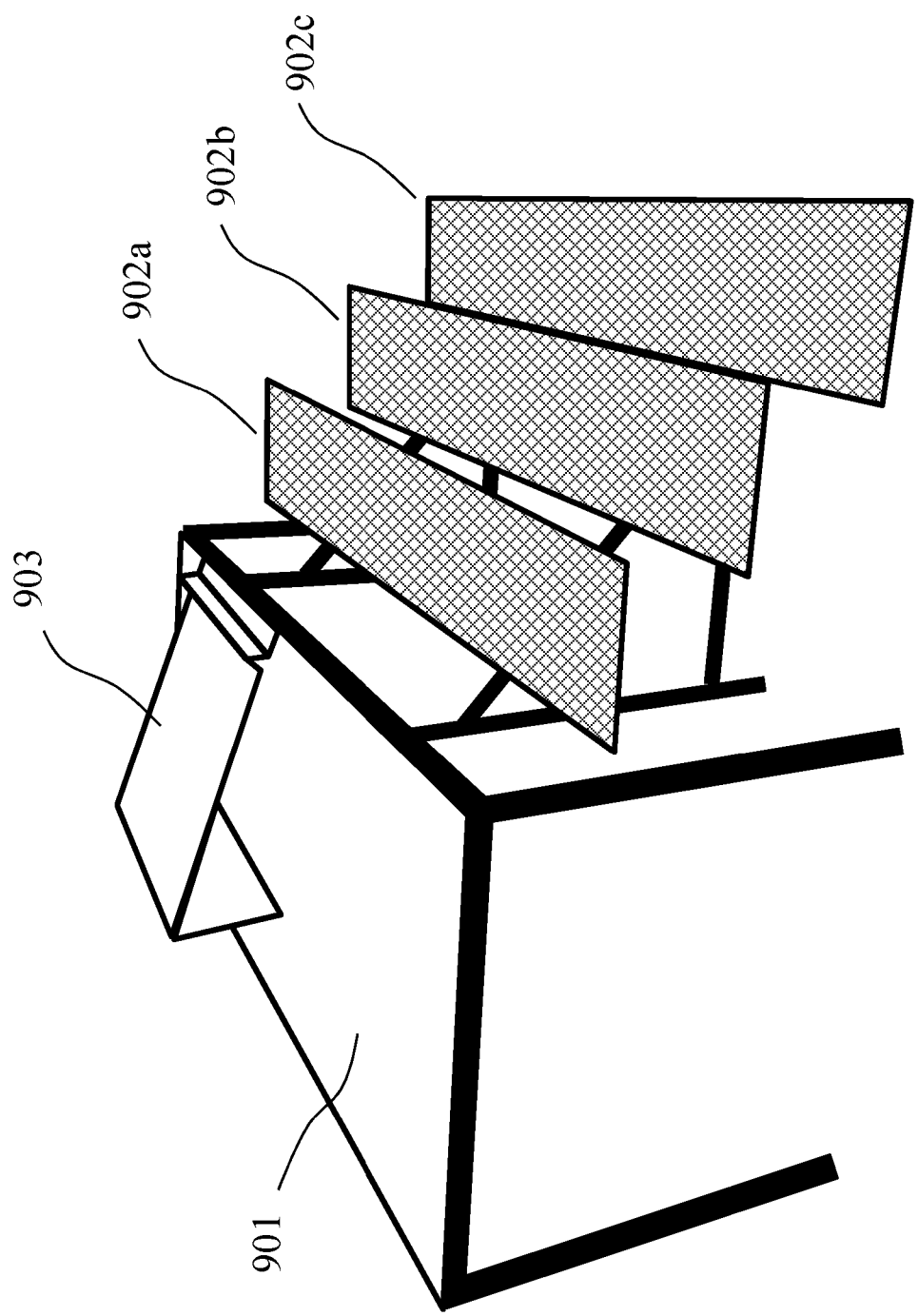
FIG. 9 is a photograph of a design station for use in assembling an actual physical assembly of design elements arranged according to a proposed design.

With reference to FIG. 9, a design station consists of one or more design tables 901 and one or more design benches 902. The benches can be butted to a design table, a wall or they can be combined to provide a variety of configurations.

Figure 10:
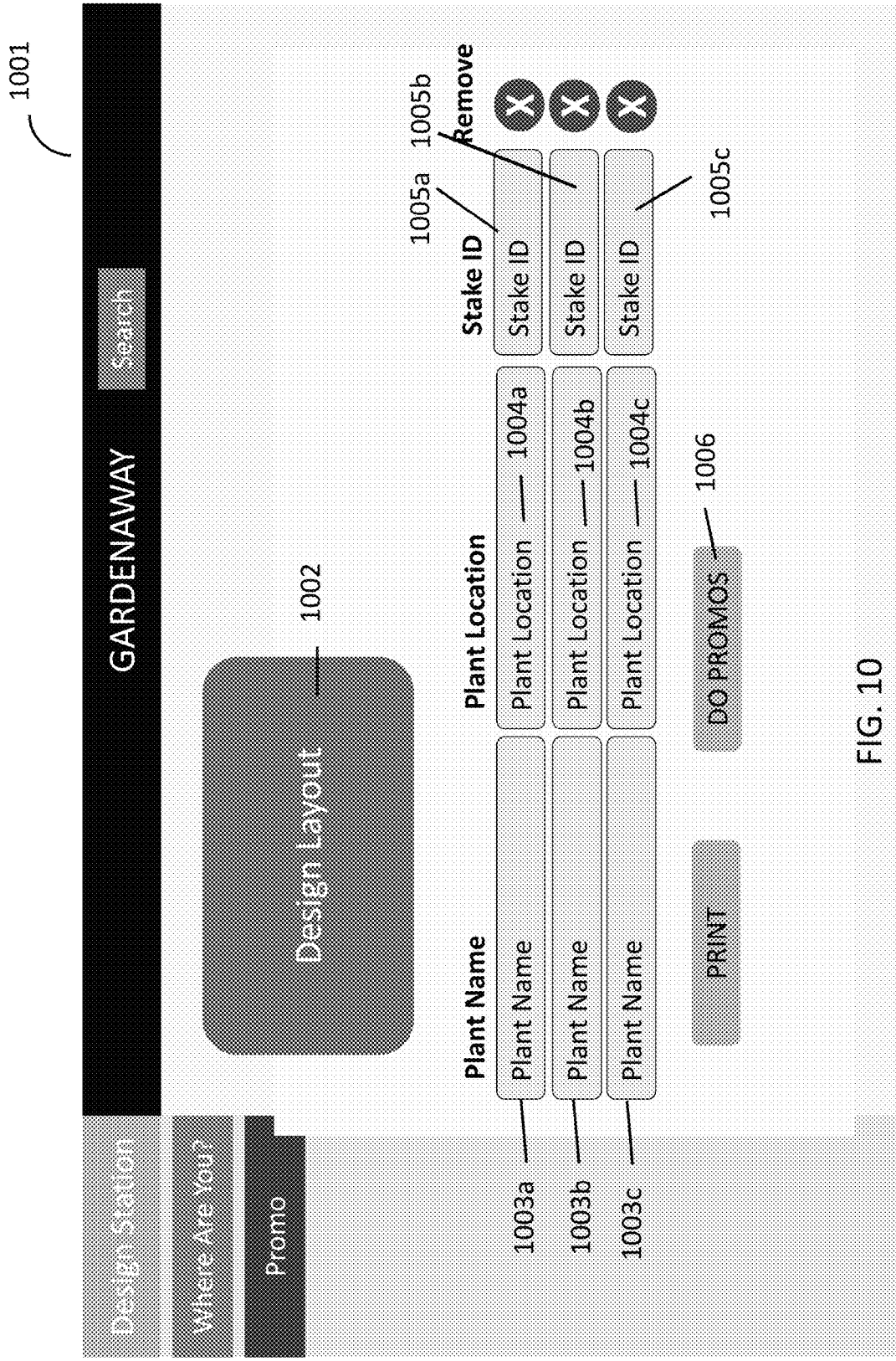
FIG. 10 is a first screen shot of a display produced by a design assist application to assist a user of the design station shown in FIG. 9.

A raised platform, referred hereafter as a design lift 903, is used to elevate plants, flowers and other design elements to various heights to provide an improved perception and scale of plant growth, height and placement within the pattern. With reference to FIG. 10, each design station setup 1001 is entered into the design assist application by the merchant and is assigned a specific identification number or code. The merchant can upload the design layout 1002, lists of plants, flowers and other design elements 1003*a*, 1003*b*, 1003*c*, including the location of the items 1004*a*, 1004*b*, 1004*c* within the merchant's premises which would be used in a garden pattern or scene layout 1002. The identification code or number 1005*a*, 1005*b*, 1005*c* for each design element is also added to the system. Additionally, the merchant would enter into the system the relevant inventory information including availability, quantity and price. The merchant may also include optional promotions 1007 or price incentive to get the customer's attention.

The merchant physically arranges design elements into a pattern or scene on the tables and benches as directed by the design assist application. The application may direct a merchant to use a design lift 903 under specific design elements in accordance with the pattern stored in the system matching the specific design station. The design assist application may also send reminders to the merchant if a garden pattern or scene has not been refreshed over some period of time, or if the system detects that the inventory levels are low or demand for a specific garden pattern or scene has changed. The merchant may also create new garden patterns and scenes by experimenting with different plant and flower combinations at the design station and then enter the data into the system once he is satisfied with the arrangement.

Each design element within the design station has a tag or sticker containing a unique identifier (code or number). The unique identifier would further include the shelf location on the design station, thereby making it easier for the customer to locate a design element of interest. For example, the shelves may simply be tagged as shelf 1, shelf 2 and shelf 3. If each shelf contained 3 design elements then they would be tagged as 1*a*, 1*b*, 1*c*, 2*a*, 2*b*, 2*c* and 3*a*, 3*b* 3*c*. It should be noted, however, that different combinations of shelves and tables and different combination of design elements are possible.

Figure 11:
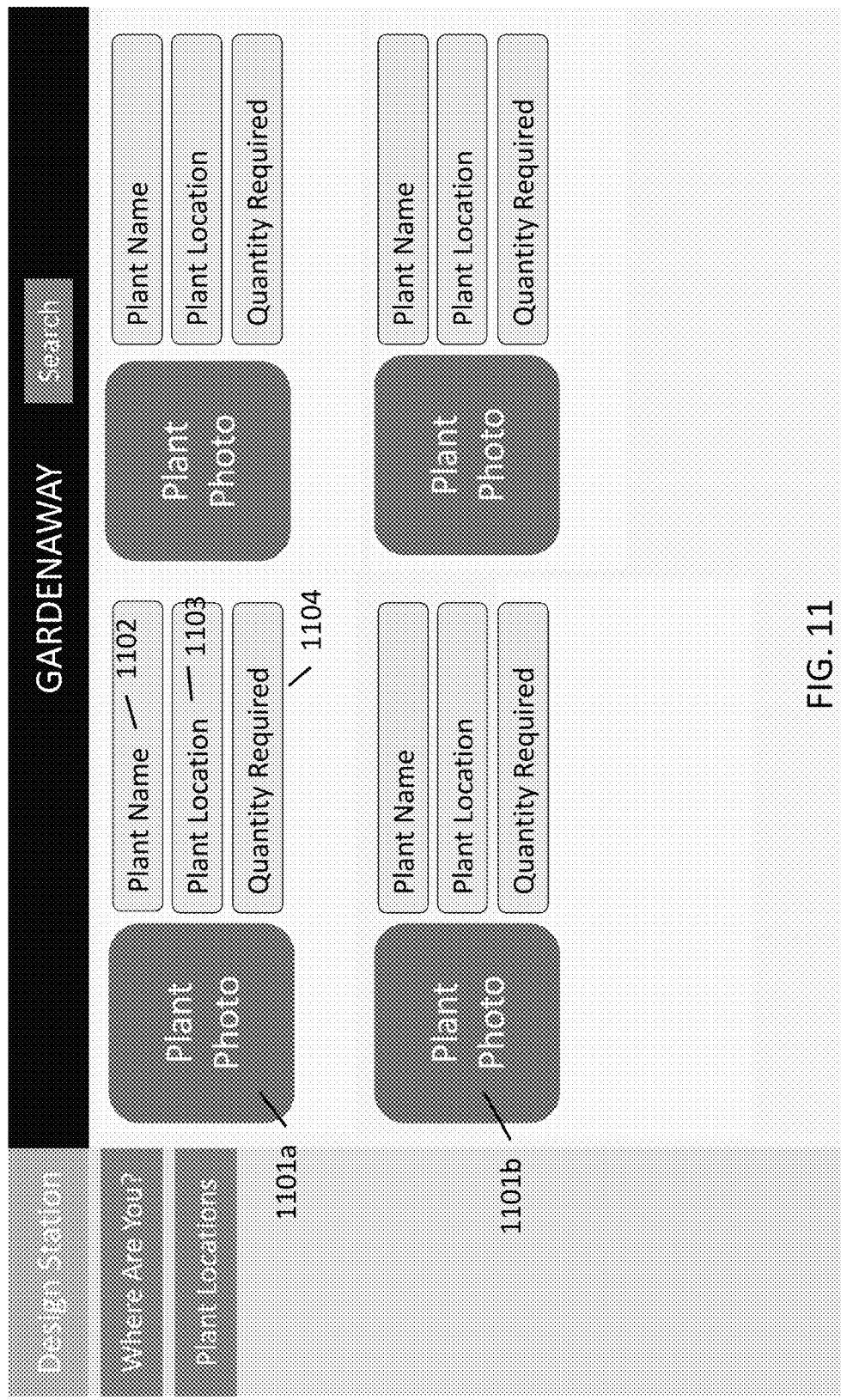
FIG. 11 is a second screen shot of a display produced by a design assist application to assist a user of the design station shown in FIG. 9, including photographs of selected design elements.

Customers can view the patterns or scenes at each design station, select the pattern or scene they are interested in and use a handheld device to scan a code (barcode, QR code), to enter a number located on the tag or sticker on the design elements or the design station. The handheld device may be a smartphone, tablet or any other device capable of scanning a code or number. With Reference to FIG. 11, the handheld device has the landscape design application uploaded, and the device can be the customer's personal device or a device that is loaned to the customer by the merchant, for use on the premises. The landscape design application can determine which merchant, which design station and which pattern configuration the customer is interested in, based on the scanned codes.

The design application identifies the design elements on the display stations by displaying photographs 1101*a*, 1101*b*, 1101*c*, plant names 1102 and plant locations 1103 within the merchant's inventory, so the customer does not need to know the names of the various plants within the displayed pattern. Customers can use the design application to locate the design elements within the merchant's premises so the customers can select and purchase the design elements.

Figure 12A:
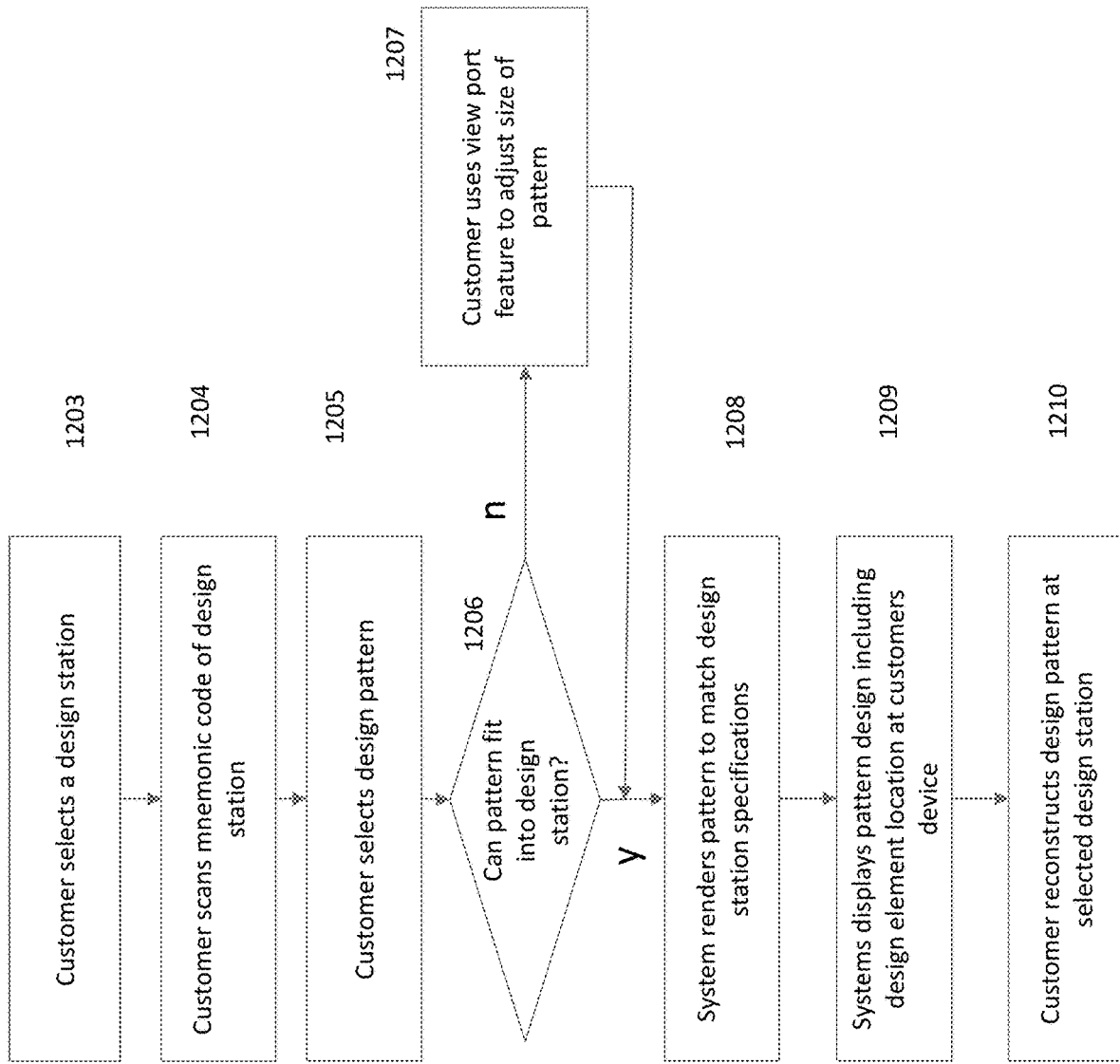
FIG. 12A is a flowchart of the steps involved in constructing a design pattern at a design station.

Alternatively, the design assist application may be used to allow customers to select pre-existing garden patterns or scenes stored in the system or prepare a design station themselves at a merchant location. With reference to the flowchart of FIG. 12A, a merchant can provide the design station equipment, including tables, benches and design lifts. If the customer decides to use a pre-existing pattern stored in the system, then the customers can review the options and select the garden scenes or garden patterns they wish to layout and visualize at step 1205. The customer then selects the station they wish to use to assemble the pattern they have chosen in step 1203 by scanning the unique code assigned to the station in step 1204. At the query in step 1206, if the scene or garden fits into the particular design station provided, the customer may proceed to the layout stage in step 1208. This is a beneficial feature as it avoids the customer selecting a garden pattern or scene that is too large for the design table to accommodate. The system matches the garden pattern to the selected design station in step 1208 and provides the customer with the instructions for assembly, as well as design element information including location of the design elements within the merchant's premises, at step 1209. The customer then has all the information needed to locate the design elements and assemble the selected design pattern at the design station 1210.

With reference to FIG. 12B, if the design station is not large enough then the customers have the option of selecting a portion of the pattern or scene using a "view port" feature 1202 to choose the area that they are interested in. The system provides a grid layout 1201 of the garden pattern or scene and the view port feature 1202 will match the selected portion of the pattern or scene to fit the design table. Customers are then guided to layout their design elements by choosing labeled or tagged design elements from the merchant's shelves and inventory stock for placement on the labeled or grid table surface as per the applications instructions.

Figure 13:
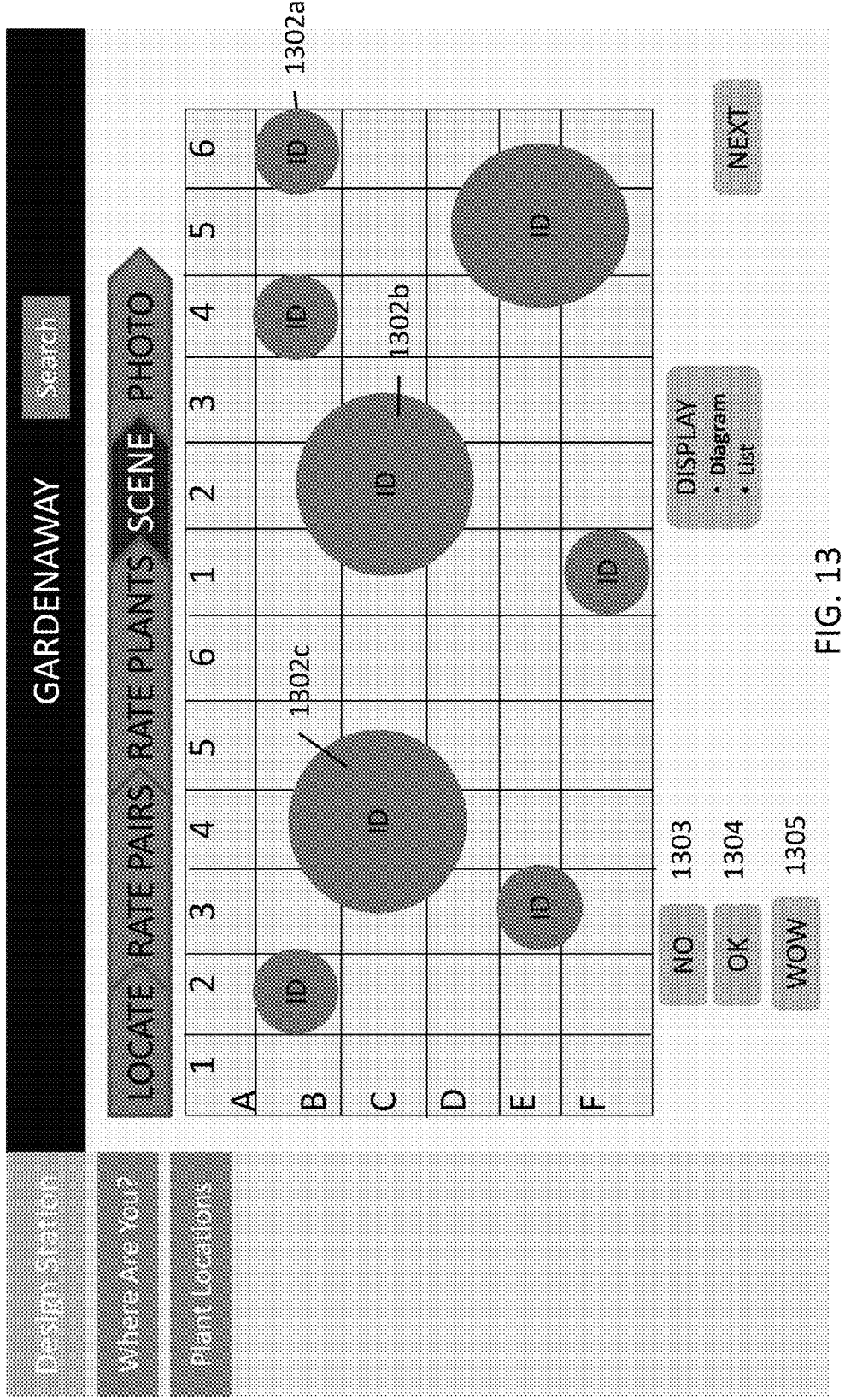
FIG. 13 is a third screen shot of a display produced by a design assist application to assist a user of the design station shown in FIG. 9.

FIG. 13 shows a layout plan screen that the customer can use for this purpose. The screen includes both the position of the design elements on a grid and the ID numbers 1302*a*, 1302*b*, 1302*c* of the design elements. The customer may then provide feedback to the system by rating an arrangement as for example, "wow" 1305, "ok" 1304 or "no" 1303. This feedback may be used by the merchant to classify scenes and patterns, download alternatives or prioritize inventory. The design application may also contain a predetermined set of rules regarding the placement of at least one of the selected landscape design patterns and the selected landscape design elements relative to each other, for evaluating the selected locations of at least one of said selected landscape design patterns and the selected landscape design elements.

Figure 14:
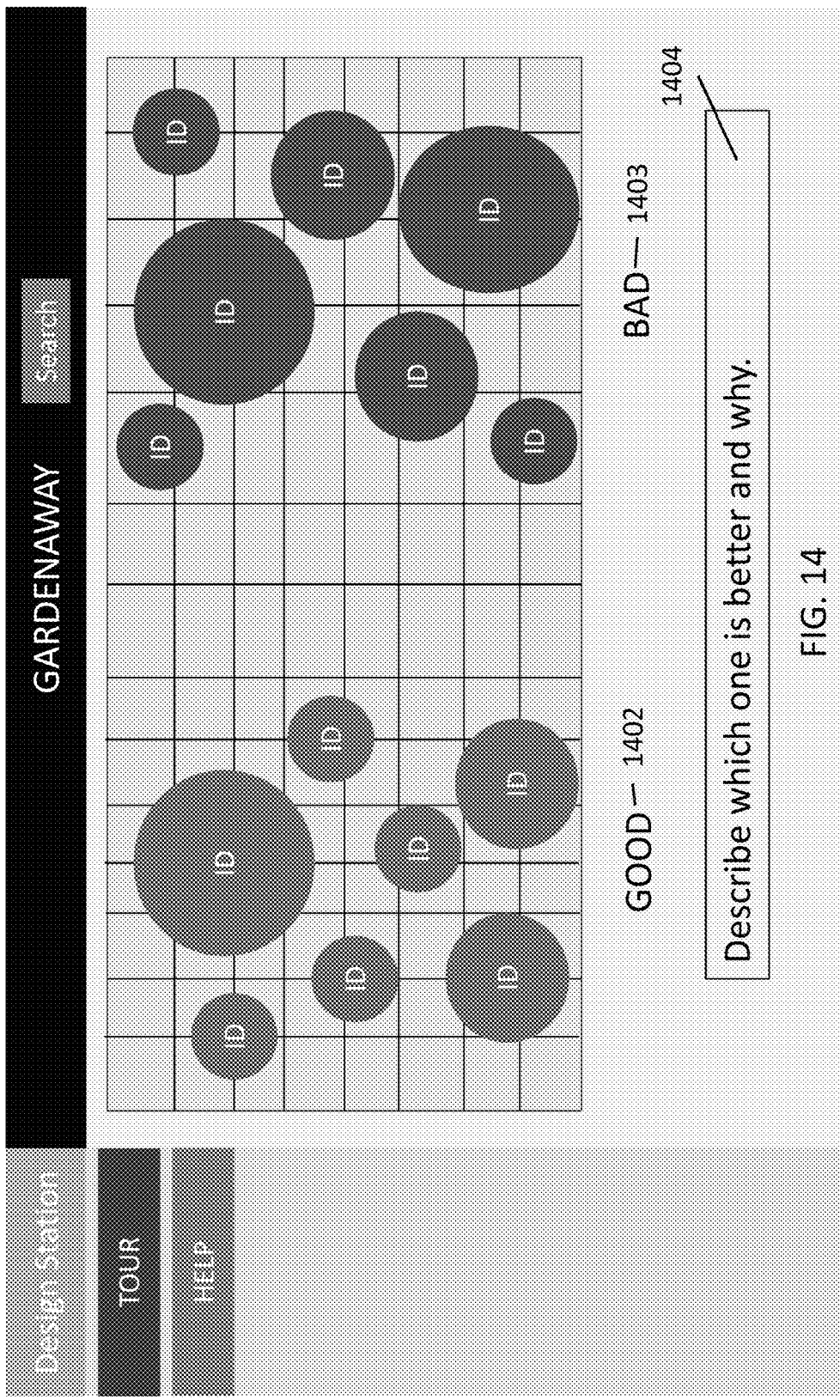
FIG. 14 is a fourth screen shot of a display produced by a design assist application to assist a user of the design station shown in FIG. 9.

As shown in FIG. 14, if the customer is unfamiliar with the purpose of the design station and/or decides to create his or her own garden pattern or scene, the design assist application feature "merchant station tour" 1401 walks the customer through the steps of building a garden. The application feature provides guidance on what constitutes a bad scene 1403 vs. a good scene 1402 and includes descriptive text 1404 to illustrate the essence of good garden design. Specifically, the application evaluates the selected locations of the selected design patterns and/or the selected design elements by comparing the selected locations with a predetermined set of rules regarding the placement of the selected design patterns and/or the selected design elements relative to each other.

The design assist application may also be used to assist a customer or merchant in photographing the display and sharing the photographs on, for example, a social media site. This requires a smart phone, tablet or other handheld device, which includes a camera and has the design system uploaded. Alternatively a digital camera whose photographs can be uploaded to a computer may also be used. The design assist application, which also runs on a computer, can be used to upload those photos and attach them to the design. Specially designed equipment is preferably used, including an angled stand that is painted a colour that stands out from the plants. This colour allows the post-processing features of the design assist application to detect the edges of the photograph by distinguishing between the colours of the plants and the colour of the stand, similar to using a green screen in a movie. Using the known colour values of the stand, the colours in the photograph can be adjusted to remedy any white balance offset and extract the plant photos from the background.

Although the algorithms described above, including those with reference to the foregoing flow charts, have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible storage device or medium such as, for example, a flash memory, a CD-ROM, a floppy disk, a hard drive, a digital versatile disk (DVD), or other memory devices but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein have various modules which perform particular functions that interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

The invention claimed is:

1. A method of obtaining a landscape design pattern using a landscape design system allowing a user to establish the landscape design pattern based upon stored landscape design elements and stored landscape design patterns, said method comprising:

providing a computer system comprising a microprocessor, and a memory, the computer system upon executing a software application forming part of the landscape design system being configured to:

connect to a communications network;

store within the memory multiple landscape design elements and multiple landscape design patterns, wherein each landscape design element represents an abstraction of one or more physical items and has assigned to it a unique code, a type, and a number of attributes, each unique code may relate to multiple physical items of the same type that share one or more common attributes; and each landscape design pattern comprises at least two landscape design elements;

receive data from an electronic device connected to the communications network data relating to definition of a scene relative to a canvas comprising a number of segments which has been presented to the user within a graphical user interface (GUI) upon a display of the electronic device by another software application forming part of the landscape design system in execution upon the electronic device upon the display, the first data relating to user actions with respect to a shape editor also displayed to the user within the GUI and the user selections and placements of one or more simple shapes directly or as reshaped by the user onto the canvas;

receive further data from the electronic device, the further data comprising for each segment underlying part of the defined scene one or more selections established by the user, each selection relating to one of a pattern attribute, a physical item, a landscape design element, and a landscape design pattern;

generate a recommended scene for presentation to the user, the recommended scene comprising a set of recommended patterns, the set of recommended patterns comprising a subset of the multiple landscape design patterns;

transmit the recommended scene to the electronic device; and receive additional data from the electronic device, the additional data relating to at least one of an action relating to a landscape design element and another action relating to an attribute established by the user;

providing the electronic device comprising another microprocessor, another memory, the display, a user interface, the electronic device upon executing the second software application forming part of the landscape design system being configured to:

connect to the communications network;

render the canvas comprising the number of segments within the GUI upon the display of the electronic device;

acquire user inputs from the user interface relating to user actions with respect to the shape editor also displayed to the user within the GUI upon the display of the electronic device, the user actions being user selections and placements of one or more simple shapes directly or as reshaped by the user onto the canvas;
generate the data in dependence upon the user inputs;
transmit the data to the computer system;
acquire further user inputs via the user interface relating to further user actions with respect to each segment underlying part of the defined scene, the further user actions comprising one or more selections established by the user, each selection relating to one of a pattern attribute, a physical item, a landscape design element, and a landscape design pattern;
generate the further data in dependence upon the further user inputs;
transmit the further data to the computer system;
receive data relating to the recommended scene from the computer system;
render the recommended scene within the GUI upon the display of the electronic device;
acquire additional user inputs via the user interface relating to additional user actions with respect to the rendered recommended scene, each additional user action being to at least one of an action relating to a landscape design element and another action relating to an attribute established by the user;
render the edited and updated recommended scene within the GUI upon the display of the electronic device;
generate the additional data in dependence upon the additional user inputs; and
transmit the additional data to the computer system;
wherein
when the type is a plant the attribute is selected from the group comprising shape, seasonal variability, height, spread, a colour attribute, texture and opacity; and
when the attribute is a colour attribute it is selected from the group comprising bloom colour, pattern of bloom, timing of bloom, foliage colour, pattern of foliage, and timing of foliage.

2. The method of claim 1, wherein
the computer system is further configured by the software application to:
generate guidance established in dependence upon automatically evaluating upon the computer system the one or more selections made by the user with respect to at least one of said selected landscape design patterns and said selected landscape design elements by comparing said selected locations with a set of rules stored within the memory regarding the placement of at least one of said selected landscape design patterns and said selected landscape design elements relative to each other; and
transmit the guidance to the electronic device; and
the electronic device is further configured by the another software application to:
render the guidance within the GUI upon the display of the electronic device;
wherein
a first portion of the set of rules are predetermined rules relating to conditions established for the segments and a second portion of the set of rules are established in dependence upon previous selections made by other users.

3. The method according to claim 1, wherein
the type may be a plant, an item of furniture, or a piece of art.

4. The method according to claim 1, wherein
the electronic device is further configured by the another software application to:
acquire subsequent data via the user interface relating to subsequent user actions with respect to the user establishing at least one segment underlying part of the defined scene one or more conditions; and
transmit the subsequent data to the computer system.

5. The method according to claim 4, wherein
a condition defines a degree of a plant condition, the plant condition selected from the group comprising sun, water, soil, soil acidity, cover, care, and what is adjacent to the segment.

6. The method according to claim 1, wherein
the electronic device is further configured by the another software application to:
acquire subsequent data via the user interface relating to subsequent user actions with respect to the user establishing for at least one segment underlying part of the defined scene one or more conditions relating to a degree of a plant condition, the plant condition selected from the group comprising sun, water, soil, soil acidity, cover, care, and what is adjacent to the segment; and
transmit the subsequent data to the computer system; and
the computer system is further configured by the software application to:
receive the subsequent data; and
automatically generate in dependence upon at least the landscape design elements within the subset of the multiple landscape design patterns forming the recommended scene a list of products;
wherein
each product within the list of products being established in dependence upon the attributes of the unique code and the one or more conditions associated with the segment within which the landscape design element to which the unique code refers is located.

7. The method according to claim 1, wherein
the electronic device is further configured by the another software application to:
acquire subsequent data via the user interface relating to subsequent user actions with respect to the user establishing for at least one segment underlying part of the defined scene one or more conditions relating to a degree of a plant condition, the plant condition selected from the group comprising sun, water, soil, soil acidity, cover, care, and what is adjacent to the segment; and
transmit the subsequent data to the computer system;
receive supplementary data from the computer system relating to the recommended scene; and
the computer system is further configured by the software application to:
receive the subsequent data from the electronic device;
automatically generate in dependence upon at least the landscape design elements within the subset of the multiple landscape design patterns forming the recommended scene a list of products established in dependence upon the attributes of at least one of the elements and the unique code and the one or more conditions associated with the segment within which the landscape design element to which the at least one of the elements and the unique code is located as defined by the subsequent data; and generate the supplementary data from the list of products; and transmit the supplementary data to the electronic device;

wherein rendering the recommended scene comprises rendering each product within the list of products at its appropriate position within the predetermined scene as determined by the landscape design element to which the unique code refers and the landscape design pattern to which the landscape design element belongs.

8. The method according to claim 1, wherein
rendering the recommended scene comprises rendering the recommended scene at a particular growth stage.

9. The method according to claim 1, wherein
the electronic device is further configured by the another software application to:
establish multiple physical markers within a region to which the predetermined scene relates in dependence upon the scene defined by the user within the GUI; and
acquire one or more images of the region with a subset of the multiple physical markers within the image; and
when rendering the recommended scene the electronic device maps the acquired one or more images of the real world to a virtual world view in dependence upon aligning the subset of the multiple physical markers within the image with virtual markers established by the landscape design system.

10. The method according to claim 1, wherein
a selection of the one or more selections is established in dependence upon automatic analysis by the computer system of an image either stored within the memory, one or more non-transitory computer-readable storage media, acquired from the Internet under direction of the user, or acquired from an image provided by the user.

11. The method according to claim 1, wherein
the electronic device is further configured by the another software application to:
acquire subsequent data via the user interface relating to subsequent user actions with respect to the user establishing an indication of a scene focal point within the recommended scene;
transmit the subsequent data to the computer system;
the computer system is further configured by the software application to:
receive the subsequent data from the electronic device; and
automatically match a pattern focal point associated with a landscape design pattern selected by the user with the scene focal point and provide an indication of the pattern focal point within scene data transmitted to the electronic device for rendering the predetermined scene.

12. The method according to claim 1, wherein
the computer system is further configured by the software application to:
transmit requests to one or more remote computer systems connected to the communications network associated with one or more merchants for an inventory; and
automatically synchronize a database of the landscape design system accessed by the software application with the received inventory of each of the one or more merchants in order to establish those products recommended by the landscape design system in dependence upon the unique codes of the multiple landscape design elements and the one or more conditions established by the user for each segment underlying the defined scene.

13. The method according to claim 1, wherein
the predetermined scene may be sold, shared, or otherwise acquired by another user; and
the landscape design system automatically modifies the products recommended to the another user in dependence upon the unique codes of the multiple landscape design elements and the one or more conditions established by the another user for each segment underlying the defined scene.

14. The method according to claim 1, wherein
rendering to the user the recommended scene comprises rendering for each landscape design element a physical item; wherein
the physical item rendered is established in dependence upon:
the physical item having the same unique code as that associated with the landscape design element; and
the physical item has a set of attribute values that match values established by the user for that portion of the landscape design comprising the landscape design element.

15. The method according to claim 1, wherein
the computer system is further configured by the software application to:
provide a list of the physical items within the landscape design, each physical item associated with a landscape design element within the landscape design and established in dependence upon:
the physical item having the same unique code as that associated with the landscape design element; and
the physical item has a set of attribute values that match values established by the user for that portion of the landscape design comprising the landscape design element.

16. A method of obtaining a landscape design pattern using a landscape design system allowing a user to establish the landscape design pattern based upon stored landscape design elements and stored landscape design patterns, said method comprising:
providing a computer system comprising a microprocessor, and a memory, the computer system upon executing a software application forming part of the landscape design system being configured to:
connect to a communications network;
store within the memory multiple landscape design elements and multiple landscape design patterns, wherein each landscape design element represents an abstraction of one or more physical items and has assigned to it a unique code, a type, and a number of attributes, each unique code may relate to multiple physical items of the same type that share one or more common attributes; and each landscape design pattern comprises at least two landscape design elements;
receive data from an electronic device connected to the communications network, the data relating to definition of a scene relative to a canvas comprising a number of segments which has been presented to the user within a graphical user interface (GUI) upon a display of the electronic device by an another software application forming part of the landscape design system in execution upon the electronic device upon the display, the data relating to user actions with respect to a shape editor also displayed to the user within the GUI and the user selections and placements of one or more simple shapes directly or as reshaped by the user onto the canvas;

receive further data from the electronic device, the further data comprising for each segment underlying part of the defined scene one or more selections established by the user, each selection relating to one of a pattern attribute, a physical item, a landscape design element, and a landscape design pattern;

generate a recommended scene for presentation to the user, the recommended scene comprising a set of recommended patterns, the set of recommended patterns comprising a subset of the multiple landscape design patterns;

transmit the recommended scene to the electronic device; and receive additional data from the electronic device, the additional data relating to at least one of an action relating to a landscape design element and another action relating to an attribute established by the user;

providing the electronic device comprising another microprocessor, another memory, the display, a user interface, the electronic device upon executing the second software application forming part of the landscape design system being configured to:

connect to the communications network;

render the canvas comprising the number of segments within the GUI upon the display of the electronic device;

acquire user inputs from the user interface relating to user actions with respect to the shape editor also displayed to the user within the GUI upon the display of the electronic device, the user actions being user selections and placements of one or more simple shapes directly or as reshaped by the user onto the canvas;

generate the data in dependence upon the first user inputs;

transmit the data to the computer system;

acquire further user inputs via the user interface relating to further user actions with respect to each segment underlying part of the defined scene, the second user actions comprising one or more selections established by the user, each selection relating to one of a pattern attribute, a physical item, a landscape design element, and a landscape design pattern;

generate the second data in dependence upon the second user inputs;

transmit the second data to the computer system;

receive data relating to the recommended scene data from the computer system;

render the recommended scene within the GUI upon the display of the electronic device;

acquire additional user inputs via the user interface relating to additional user actions with respect to the rendered recommended scene, each additional user actions being to at least one of an action relating to a landscape design element and another action relating to an attribute established by the user;

render the edited and updated recommended scene within the GUI upon the display of the electronic device;

generate the additional data in dependence upon the additional user inputs; and transmit the additional data to the computer system;

wherein a condition defines a degree of a plant condition, the plant condition selected from the group comprising sun, water, soil, soil acidity, cover, care, and what is adjacent to the segment.

17. A method of obtaining a landscape design pattern using a landscape design system allowing a user to establish the landscape design pattern based upon stored landscape design elements and stored landscape design patterns, said method comprising:

providing a computer system comprising a microprocessor, and a memory, the computer system upon executing a software application forming part of the landscape design system being configured to:

connect to a communications network;

store within the memory multiple landscape design elements and multiple landscape design patterns, wherein each landscape design element represents an abstraction of one or more physical items and has assigned to it a unique code, a type, and a number of attributes, each unique code may relate to multiple physical items of the same type that share one or more common attributes; and each landscape design pattern comprises at least two landscape design elements;

receive data from an electronic device connected to the communications network, the data relating to definition of a scene relative to a canvas comprising a number of segments which has been presented to the user within a graphical user interface (GUI) upon a display of the electronic device by another software application forming part of the landscape design system in execution upon the electronic device upon the display, the data relating to user actions with respect to a shape editor also displayed to the user within the GUI and the user selections and placements of one or more simple shapes directly or as reshaped by the user onto the canvas;

receive another data from the electronic device, the another data comprising for each segment underlying part of the defined scene one or more selections established by the user, each selection relating to one of a pattern attribute, a physical item, a landscape design element, and a landscape design pattern;

generate a recommended scene for presentation to the user, the recommended scene comprising a set of recommended patterns, the set of recommended patterns comprising a subset of the multiple landscape design patterns;

transmit the recommended scene to the electronic device; and receive additional data from the electronic device, the additional data relating to at least one of an action relating to a landscape design element and another action relating to an attribute established by the user;

providing the electronic device comprising another microprocessor, another memory, the display, a user interface, the electronic device upon executing the second software application forming part of the landscape design system being configured to:

connect to the communications network;

render the canvas comprising the number of segments within the GUI upon the display of the electronic device;

acquire user inputs from the user interface relating to user actions with respect to the shape editor also displayed to the user within the GUI upon the display of the electronic device, the user actions being user selections and placements of one or more simple shapes directly or as reshaped by the user onto the canvas;

generate the data in dependence upon the first user inputs;

transmit the data to the computer system;

acquire further user inputs via the user interface relating to further user actions with respect to each segment underlying part of the defined scene, the further user actions comprising one or more selections established by the user, each selection relating to one of a pattern attribute, a physical item, a landscape design element, and a landscape design pattern;

generate the further data in dependence upon the further user inputs;

transmit the further data to the computer system;

receive data relating to the recommended scene data from the computer system;

render the recommended scene within the GUI upon the display of the electronic device;

acquire additional user inputs via the user interface relating to additional user actions with respect to the rendered recommended scene, each additional user actions being to at least one of an action relating to a landscape design element and another action relating to an attribute established by the user;

render the edited and updated recommended scene within the GUI upon the display of the electronic device;

generate the additional data in dependence upon the additional user inputs; and transmit the additional data to the computer system; wherein each product within the list of products being established in dependence upon the attributes of the unique code and the one or more conditions associated with the segment within which the landscape design element to which the unique code refers is located.

18. A method of obtaining a landscape design pattern using a landscape design system allowing a user to establish the landscape design pattern based upon stored landscape design elements and stored landscape design patterns, said method comprising:

providing a computer system comprising a microprocessor, and a memory, the computer system upon executing a software application forming part of the landscape design system being configured to:

connect to a communications network;

store within the memory multiple landscape design elements and multiple landscape design patterns, wherein each landscape design element represents an abstraction of one or more physical items and has assigned to it a unique code, a type, and a number of attributes, each unique code may relate to multiple physical items of the same type that share one or more common attributes; and each landscape design pattern comprises at least two landscape design elements;

receive data from an electronic device connected to the communications network, the data relating to definition of a scene relative to a canvas comprising a number of segments which has been presented to the user within a graphical user interface (GUI) upon a display of the electronic device by a second software application forming part of the landscape design system in execution upon the electronic device upon the display, the data relating to user actions with respect to a shape editor also displayed to the user within the GUI and the user selections and placements of one or more simple shapes directly or as reshaped by the user onto the canvas;

receive further data from the electronic device, the further data comprising for each segment underlying part of the defined scene one or more selections established by the user, each selection relating to one of a pattern attribute, a physical item, a landscape design element, and a landscape design pattern;

generate a recommended scene for presentation to the user, the recommended scene comprising a set of recommended patterns, the set of recommended patterns comprising a subset of the multiple landscape design patterns;

transmit the recommended scene to the electronic device; and receive additional data from the electronic device, the additional data relating to at least one of an action relating to a landscape design element and another action relating to an attribute established by the user;

providing the electronic device comprising another microprocessor, another memory, the display, a user interface, the electronic device upon executing the second software application forming part of the landscape design system being configured to:

connect to the communications network;

render the canvas comprising the number of segments within the GUI upon the display of the electronic device;

acquire user inputs from the user interface relating to user actions with respect to the shape editor also displayed to the user within the GUI upon the display of the electronic device, the user actions being user selections and placements of one or more simple shapes directly or as reshaped by the user onto the canvas;

generate the data in dependence upon the user inputs;

transmit the data to the computer system;

acquire further user inputs via the user interface relating to further user actions with respect to each segment underlying part of the defined scene, the further user actions comprising one or more selections established by the user, each selection relating to one of a pattern attribute, a physical item, a landscape design element, and a landscape design pattern;

generate the further data in dependence upon the further user inputs;

transmit the further data to the computer system;

receive data relating to the recommended scene data via the second network interface from the computer system;

render the recommended scene within the GUI upon the display of the electronic device;

acquire additional user inputs via the user interface relating to additional user actions with respect to the rendered recommended scene, each additional user actions being to at least one of an action relating to a landscape design element and another action relating to an attribute established by the user;

render the edited and updated recommended scene within the GUI upon the display of the electronic device;

generate the additional data in dependence upon the additional user inputs; and transmit the additional data to the computer system;

wherein rendering the recommended scene comprises rendering each product within the list of products at its appropriate position within the predetermined scene as determined by the landscape design element to which the unique code refers and the landscape design pattern to which the landscape design element belongs.

* * * * *